United States Patent [19]
Shimada et al.

[11] Patent Number: 6,052,162
[45] Date of Patent: Apr. 18, 2000

[54] TRANSMISSION TYPE LIQUID CRYSTAL DISPLAY DEVICE WITH CONNECTING ELECTRODE AND PIXEL ELECTRODE CONNECTED VIA CONTACT HOLE THROUGH INTERLAYER INSULATING FILM AND METHOD FOR FABRICATING

[75] Inventors: Takayuki Shimada, Yamatokoriyama; Masaru Kajitani, Osaka; Masaya Okamoto, Soraku-gun; Naofumi Kondo; Mikio Katayama, both of Ikoma; Yoshikazu Sakuhana, Yamatokoriyama; Akihiro Yamamoto, Tenri; Yukinobu Nakata, Tenri; Hirohiko Nishiki, Tenri; Yoshinori Shimada, Yamatokoriyama, all of Japan

[73] Assignee: Sharp Kabushiki Kaisha, Osaka, Japan

[21] Appl. No.: 08/695,632

[22] Filed: Aug. 12, 1996

[30] Foreign Application Priority Data

Aug. 11, 1995 [JP] Japan .................................. 7-206367
Sep. 29, 1995 [JP] Japan .................................. 7-254043

[51] Int. Cl.⁷ ............................. G02F 1/343; G02F 1/136
[52] U.S. Cl. ................................. 349/38; 349/39; 349/43; 349/44
[58] Field of Search .................................. 349/38, 39, 43, 349/139, 44, 42

[56] References Cited

U.S. PATENT DOCUMENTS

| 3,602,782 | 8/1971 | Klein ..................................... 317/235 R |
| 4,688,896 | 8/1987 | Castleberry ............................. 350/333 |
| 4,759,610 | 7/1988 | Yanagisawa ............................ 350/334 |
| 4,857,907 | 8/1989 | Wakai et al. . |
| 4,923,948 | 5/1990 | Matsuki et al. ........................... 528/26 |
| 5,003,356 | 3/1991 | Wakai et al. . |
| 5,032,883 | 7/1991 | Wakai et al. .............................. 357/23 |
| 5,166,085 | 11/1992 | Wakai et al. .............................. 437/40 |
| 5,182,661 | 1/1993 | Ikeda et al. ............................... 359/54 |
| 5,335,102 | 8/1994 | Kanemori et al. ........................ 359/59 |
| 5,446,562 | 8/1995 | Sato ......................................... 359/59 |

(List continued on next page.)

FOREIGN PATENT DOCUMENTS

| 0117957 | 12/1984 | European Pat. Off. . |
| 0 611 812 | 8/1994 | European Pat. Off. . |
| 0 632 229 | 1/1995 | European Pat. Off. . |
| 58-184929 | 10/1983 | Japan . |
| 61-156025 | 7/1986 | Japan . |
| 62-135810 | 6/1987 | Japan . |
| 1-35351 | 7/1989 | Japan . |
| 04068318 | 3/1992 | Japan . |
| 4-307521 | 10/1992 | Japan . |
| 4-74714 | 11/1992 | Japan . |
| 5-210113 | 8/1993 | Japan . |
| 6-208137 | 7/1994 | Japan . |
| 6-230422 | 8/1994 | Japan . |
| 7-36043 | 2/1995 | Japan . |
| 7-122719 | 12/1995 | Japan . |

OTHER PUBLICATIONS

"Application of a Wide Viewing Angle Technique Essential for a Large–Area Display to Mass Production Panel of TFT Starts", Flat–Panel Display '94, p. 166, 1993.

(List continued on next page.)

Primary Examiner—William L. Sikes
Assistant Examiner—Tarifur R. Chowdhury
Attorney, Agent, or Firm—Nixon & Vanderhye P.C.

[57] ABSTRACT

The transmission type liquid crystal display device of this invention includes: gate lines; source lines; and switching elements each arranged near a crossing of each gate line and each source line, a gate electrode of each switching element being connected to the gate line, a source electrode of the switching element being connected to the source line, and a drain electrode of the switching element being connected to a pixel electrode for applying a voltage to a liquid crystal layer, wherein an interlayer insulating film formed of an organic film with high transparency is provided above the switching element, the gate line, and the source line, and wherein the pixel electrode formed of a transparent conductive film is provided on the interlayer insulating film.

18 Claims, 13 Drawing Sheets

U.S. PATENT DOCUMENTS

| | | | |
|---|---|---|---|
| 5,483,082 | 1/1996 | Takizawa et al. | 349/43 |
| 5,517,342 | 5/1996 | Kim et al. | 349/43 |
| 5,526,014 | 6/1996 | Shiba et al. | 345/96 |
| 5,573,978 | 11/1996 | Cho | 437/192 |
| 5,585,951 | 12/1996 | Noda et al. | 349/122 |
| 5,641,974 | 6/1997 | den Boer et al. | 257/59 |
| 5,658,697 | 8/1997 | Lin | 430/7 |
| 5,675,159 | 10/1997 | Oku | 257/284 |
| 5,679,596 | 10/1997 | Lu | 1/1 |
| 5,682,211 | 10/1997 | Yao et al. | 349/38 |
| 5,688,366 | 11/1997 | Ichinose et al. | 136/244 |
| 5,688,410 | 11/1997 | Kajitani et al. | 216/64 |

OTHER PUBLICATIONS

"Mass Production of CMP is Full–Fledged to be Applied to ASIC and DRAM", Nikkei Microdevices, pp. 50–57, 1994.

"Backlight", Flat–Panel Display '94, p. 217, 1993.

Patent Abstracts of Japan, vol. 017, No. 428 (P–1588), Aug. 9, 1993 & JP–A–05 088199 (Sanyo Electric Co. Ltd.), Apr. 9, 1993.

Patent Abstracts of Japan, vol. 018, No. 532 (P–1810), Oct. 7, 1994 & JP–A–06 186580 (Seiko Epson Corp.), Jul. 8, 1994.

Patent Abstracts of Japan, vol. 016, No. 218, May 21, 1992 & JP–A–04 042214, Feb. 12, 1992. Abstract.

Fujita et al, "Colorless Polyimide", Nitto Giho, vol. 29, No. 1, pp. 20–28, 1991.

Sakamoto etal, "27.3: A High–Aperture–Ratio 3–in.–Diagonal VGA a–Si Light Valve with Pixel/Data and Pixel/Gate Lines Overlapping", SID 96 Digest, pp. 681–684, 1996.

Kim et al, "4:3: High–Aperture and Fault–Tolerant Pixel Structure for TFT–LCDs", SID 95 Digest, pp. 15–18, 1995.

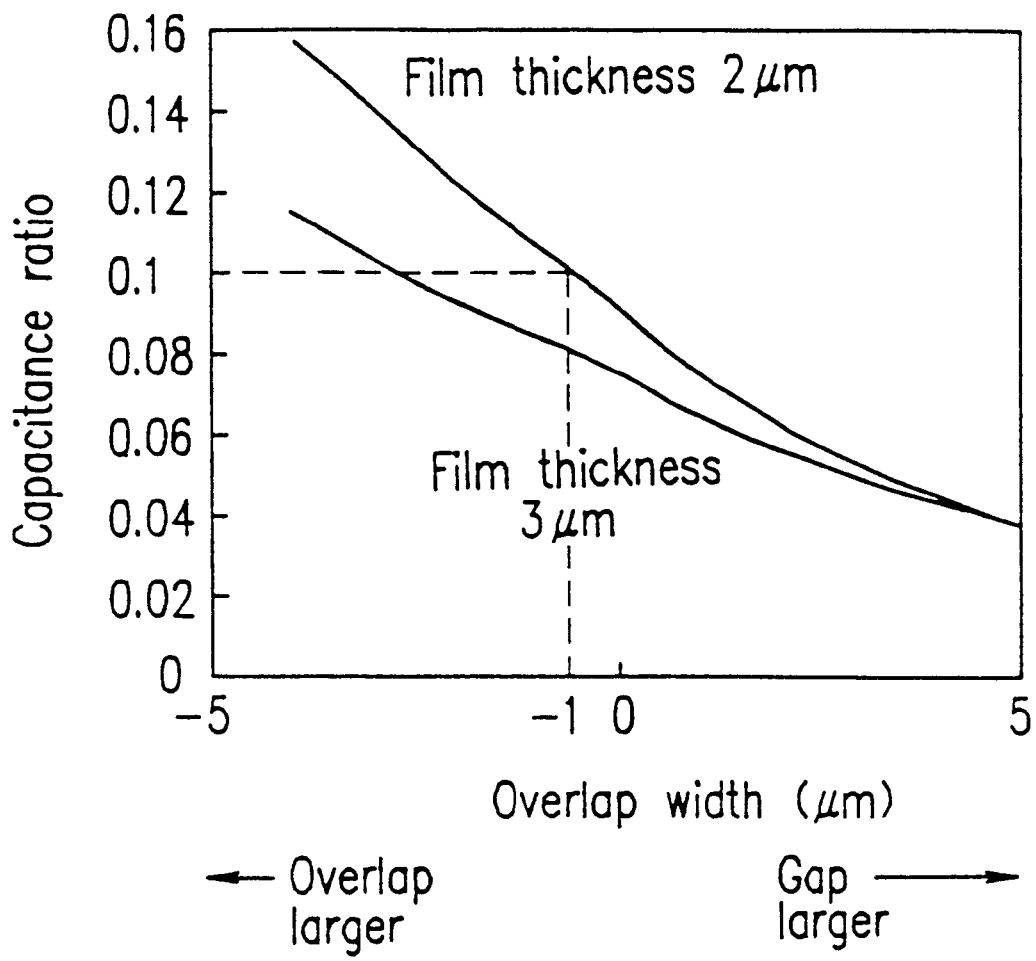

TRANSMISSION TYPE LIQUID CRYSTAL DISPLAY DEVICE WITH CONNECTING ELECTRODE AND PIXEL ELECTRODE CONNECTED VIA CONTACT HOLE THROUGH INTERLAYER INSULATING FILM AND METHOD FOR FABRICATING

RELATED APPLICATIONS

This application is related to the following commonly assigned co-pending applications: Ser. No. 08/712,978, filed Sep. 12, 1996; Ser. No. 08/700,712, filed Aug. 20, 1996; Ser. No. 08/697,277, filed Aug. 27, 1996; Ser. No. 08/705,759, filed Aug. 30, 1996; Ser. No. 08/725,663, filed Oct. 1, 1996; Ser. No. 08/722,829, filed Sep. 27, 1996; Ser. No. 08/731,551, filed Oct. 16, 1996; Ser. No. 08/721,333, filed Sep. 26, 1996; and Ser. No. 08/739,755, filed Oct. 29, 1996.

BACKGROUND OF THE INVENTION

1. Field of the Invention

The present invention relates to a transmission type liquid crystal display device which includes switching elements such as thin film transistors (hereinafter, referred to as "TFTs") as addressing elements and is used for displays of computers, TV sets, and the like, and a method for fabricating such a transmission type liquid crystal display device.

2. Description of the Related Art

FIG. 16 is a circuit diagram of a conventional transmission type liquid crystal display device provided with an active matrix substrate.

Referring to FIG. 16, the active matrix substrate includes a plurality of pixel electrodes 1 arranged in a matrix and TFTs 2 used as switching elements connected to the respective pixel electrodes 1. Gate electrodes of the TFTs 2 are connected to gate lines 3 for supplying a scanning (gate) signal, so that the gate signal can be input into the gate electrodes to control the driving of the TFTs 2. Source electrodes of the TFTs 2 are connected to source lines 4 for supplying an image (data) signal, so that the data signal can be input into the corresponding pixel electrodes 1 via the TFTs when the TFTs are being driven. The gate lines 3 and the source lines 4 run adjacent to the pixel electrodes 1 and are arranged in a matrix to cross each other. Drain electrodes of the TFTs 2 are connected to the respective pixel electrodes 1 and storage capacitors 5. Counter electrodes of the storage capacitors 5 are connected to common lines 6. The storage capacitor 5 is used for holding a voltage applied to a liquid crystal layer. The storage capacitor is provided in parallel to a liquid crystal capacitor which includes the liquid crystal layer sandwiched between a pixel electrode provided on an active matrix substrate and a counter electrode provided on a counter substrate.

FIG. 17 is a sectional view of a one-TFT portion of the active matrix substrate of the conventional liquid crystal display device.

Referring to FIG. 17, a gate electrode 12 connected to the gate line 3 shown in FIG. 16 is formed on a transparent insulating substrate 11. A gate insulating film 13 is formed covering the gate electrode 12. A semiconductor layer 14 is formed on the gate insulating film 13 so as to overlap the gate electrode 12 via the gate insulating film 13, and a channel protection layer 15 is formed on the center of the semiconductor layer 14. $n^+$-Si layers as a source electrode 16a and a drain electrode 16b are formed covering the end portions of the channel protection layer 15 and portions of the semiconductor layer 14, so that they are separated from each other at the top of the channel protection layer 15. A metal layer 17a which is to be the source line 4 shown in FIG. 16 is formed to overlap the source electrode 16a as one of the $n^+$-Si layers. A metal layer 17b is formed to overlap the drain electrode 16b as the other $n^+$-Si layer so as to connect the drain electrode 16b and the pixel electrode 1. An interlayer insulating film 18 is formed covering the TFT 2, the gate line 3, and the source line 4.

A transparent conductive film is formed on the interlayer insulating film 18 to constitute the pixel electrode 1. The transparent conductive film is connected to the metal layer 17b which is in contact with the drain electrode 16b of the TFT 2 via a contact hole 19 formed through the interlayer insulating film 18.

Thus, since the interlayer insulating film 18 is formed between the pixel electrode 1 and the underlying layers including the gate and source lines 3 and 4, it is possible to overlap the pixel electrode 1 with the lines 3 and 4. Such a structure is disclosed in Japanese Laid-Open Patent Publication No. 58-172685, for example. With this structure, the aperture ratio improves and, since the electric field generated by the lines 3 and 4 is shielded, the occurrence of disclination can be minimized.

Conventionally, the interlayer insulating film 18 is formed by depositing an inorganic material such as silicon nitride (SiN) to a thickness of about 500 nm by chemical vapor deposition (CVD).

The above conventional liquid crystal display device has disadvantages as follows.

When a transparent insulating film made of $SiN_x$, $SiO_2$, $TaO_x$, and the like is formed on the interlayer insulating film 18 by CVD or sputtering, the surface of the film directly reflects the surface profile of the underlying film, i.e., the interlayer insulating film 18. Therefore, when the pixel electrode 1 is formed on the transparent insulating film, steps will be formed on the pixel electrode 1 if the underlying film has steps, causing disturbance in the orientation of liquid crystal molecules. Alternatively, the interlayer insulating film 18 may be formed by applying an organic material such as polyimide to obtain a flat pixel portion. In such a case, however, in order to form the contact holes for electrically connecting the pixel electrodes and the drain electrodes, a series of steps including photo-patterning using a photoresist as a mask, etching for forming the contact holes, and removal of the photoresist are required. A photosensitive polyimide film may be used to shorten the etching and removal steps. In this case, however, the resultant interlayer insulating film 18 appears colored. This is not suitable for a liquid crystal display device requiring high light transmission and transparency.

The other disadvantage is as follows. When the pixel electrode 1 overlaps the gate line 3 and the source line 4 via the interlayer insulating film 18, the capacitances between the pixel electrode 1 and the gate line 3 and between the pixel electrode 1 and the source line 4 increase. In particular, when an inorganic film made of silicon nitride and the like is used as the interlayer insulating film 18, the dielectric constant of such a material is as high as 8 and, since the film is formed by CVD, the thickness of the resultant film is as small as about 500 nm. With such a thin interlayer insulating film, the capacitances between the pixel electrode 1 and the lines 3 and 4 are large. This causes the following problems (1) and (2). Incidentally, in order to obtain a thicker inorganic film made of silicon nitride and the like, an undesirably long time is required in the aspect of the fabrication process.

(1) When the pixel electrode 1 overlaps the source line 4, the capacitance between the pixel electrode 1 and the source line 4 becomes large. This increases the signal transmittance, and thus a data signal held in the pixel electrode 1 during a holding period fluctuates depending on the potential thereof. As a result, the effective voltage applied to the liquid crystal in the pixel varies, causing, in particular, vertical crosstalk toward a pixel adjacent in the vertical direction in the actual display.

In order to reduce the influence of the capacitance between the pixel electrode 1 and the source line 4 appearing on the display, Japanese Laid-Open Patent Publication No. 6-230422 proposes a driving method where the polarity of a data signal to be supplied to the pixels is inverted every source line. This driving method is effective for a black-and-white display panel where the displays (i.e., data signals) of adjacent pixels are highly correlated with each other. However, it is not effective for a color display panel for normal notebook type personal computers and the like where pixel electrodes are arranged in a vertical stripe shape (in color display, a square pixel is divided into three vertically long rectangular picture elements representing R, G, and B, forming a vertical stripe shape). The display color of pixels connected to one source line is different from that of pixels connected to an adjacent source line. Accordingly, the proposed driving method of inverting the polarity of the data signal every source line is not effective in reducing crosstalk for the general color display, though it is effective for the black-and-white display.

(2) When the pixel electrode 1 overlaps the gate line 3 for driving the pixel, the capacitance between the pixel electrode 1 and the gate line 3 becomes large, increasing the feedthrough of the write voltage to the pixel due to a switching signal for controlling the TFT 2.

SUMMARY OF THE INVENTION

The transmission type liquid crystal display device of this invention includes: gate lines; source lines; and switching elements each arranged near a crossing of each gate line and each source line. A gate electrode of each switching element is connected to the gate line, a source electrode of the switching element is connected to the source line, and a drain electrode of the switching element is connected to a pixel electrode for applying a voltage to a liquid crystal layer, wherein an interlayer insulating film formed of an organic film with high transparency is provided above the switching element, the gate line, and the source line. The pixel electrode, formed of a transparent conductive film, is provided on the interlayer insulating film.

In one embodiment of the invention, the device further includes a connecting electrode for connecting the pixel electrode and the drain electrode, wherein the interlayer insulating film is provided above the switching element, the gate line, the source line, and the connecting electrode. The pixel electrode is formed on the interlayer insulating film so as to overlap at least the gate line or the source line at least partially, and the connecting electrode and the pixel electrode are connected with each other via a contact hole formed through the interlayer insulating film.

In one embodiment of the invention, the interlayer insulating film is made of a photosensitive acrylic resin.

In one embodiment of the invention, the interlayer insulating film is made of a resin which is made transparent by optical or chemical decoloring treatment.

In one embodiment of the invention, the pixel electrode and at least one of the source line and the gate line overlap each other by 1 $\mu$m or more in a line width direction.

In one embodiment of the invention, the thickness of the interlayer insulating film is 1.5 $\mu$m or more.

In one embodiment of the invention, the connecting electrode is formed of a transparent conductive film.

In one embodiment of the invention, the device further includes a storage capacitor for holding a voltage applied to the liquid crystal layer, wherein the contact hole is formed above either an electrode of the storage capacitor or the gate line.

In one embodiment of the invention, a metal nitride layer is formed below the contact hole to connect the connecting electrode and the pixel electrode.

In one embodiment of the invention, the device further includes a storage capacitor for holding a voltage applied to the liquid crystal layer, wherein a capacitance ratio represented by expression (1):

$$\text{Capacitance ratio} = C_{sd}/(C_{sd}+C_{1s}+C_s) \tag{1}$$

is 10% or less, wherein $C_{sd}$ denotes a capacitance value between the pixel electrode and the source line, $C_{1s}$ denotes a capacitance value of a liquid crystal portion corresponding to each pixel in an intermediate display state, and $C_s$ denotes a capacitance value of the storage capacitor of each pixel.

In one embodiment of the invention, the shape of the pixel electrode is rectangular with a side parallel to the gate line being longer than a side parallel to the source line.

In one embodiment of the invention, the device further includes a driving circuit for supplying to the source line a data signal of which polarity is inverted for every horizontal scanning period, and the data signal is supplied to the pixel electrode via the switching element.

In one embodiment of the invention, the device further includes a storage capacitor for maintaining a voltage applied to the liquid crystal layer, the storage capacitor including: a storage capacitor electrode; a storage capacitor counter electrode; and an insulating film therebetween; wherein the storage capacitor electrode is formed in the same layer as either the source line or the connecting electrode.

In one embodiment of the invention, the storage capacitor counter electrode is formed of a part of the gate line.

In one embodiment of the invention, the pixel electrode and the storage capacitor electrode are connected via the contact hole formed above the storage capacitor electrode.

In one embodiment of the invention, the contact hole is formed above either the storage capacitor counter electrode or the gate line.

In one embodiment of the invention, the interlayer insulating film is formed of a photosensitive resin containing a photosensitive agent which has a reactive peak at the i line (365 nm).

According to another aspect of the invention, a method for fabricating a transmission type liquid crystal display device is provided. The method includes the steps of: forming a plurality of switching elements in a matrix on a substrate; forming a gate line connected to a gate electrode of each switching element and a source line connected to a source electrode of the switching element, the gate line and the source line crossing each other; and forming a connecting electrode formed of a transparent conductive film connected to a source electrode of the switching element. The method further includes forming an organic film with high transparency above the switching elements, the gate lines, the source lines, and the connecting lines by a coating method and patterning the organic film to form an interlayer insulating film and contact holes through the interlayer insulating film to reach the connecting electrodes. The method also includes the step of forming pixel electrodes formed of transparent conductive films on the interlayer insulating film and inside the contact holes so that each pixel electrode overlaps at least either the gate line or the source line at least partially.

In one embodiment of the invention, the patterning of the organic film is conducted by either one of the following steps: exposing the organic film to light and developing the exposed organic film, or etching the organic film by using a photoresist on the organic film as an etching mask.

In one embodiment of the invention, the patterning of the organic film includes the steps of: forming a photoresist layer containing silicon on the organic film; patterning the photoresist layer; and etching the organic film by using the patterned photoresist layer as an etching mask.

In one embodiment of the invention, the patterning of the organic film includes the steps of: forming a photoresist layer on the organic film; coating a silane coupling agent on the photoresist layer and oxidizing the coupling agent; patterning the photoresist layer; and etching the organic film by using the patterned photoresist layer covered with the oxidized coupling agent as an etching mask.

In one embodiment of the invention, the etching step is a step of dry etching using an etching gas containing at least one of $CF_4$, $CF_3H$ and $SF_6$.

In one embodiment of the invention, the organic film is formed by using a photosensitive transparent acrylic resin which dissolves in a developing solution when exposed to light, and the interlayer insulating film and the contact holes are formed by exposing the photosensitive transparent acrylic resin to light and developing the photosensitive transparent acrylic resin.

In one embodiment of the invention, the method further includes the step of, after the light exposure and development of the organic film, exposing the entire substrate to light for reacting a photosensitive agent contained in the photosensitive transparent acrylic resin, thereby decoloring the photosensitive transparent acrylic resin.

In one embodiment of the invention, a base polymer of the photosensitive transparent acrylic resin includes a copolymer having methacrylic acid and glycidyl methacrylate and the photosensitive transparent acrylic resin contains a quinonediazide positive-type photosensitive agent.

In one embodiment of the invention, the photosensitive transparent acrylic resin for forming the interlayer insulating film has a light transmittance of 90% or more for light with a wavelength in the range of about 400 nm to about 800 nm.

In one embodiment of the invention, the organic film has a thickness of about 1.5 $\mu$m or more.

In one embodiment of the invention, the method further includes the step of, before the formation of the organic film, irradiating with ultraviolet light a surface of the substrate where the organic film is to be formed.

In one embodiment of the invention, the method further includes the step of, before the formation of the organic film, applying a silane coupling agent on a surface of the substrate where the organic film is to be formed.

In one embodiment of the invention, the material for forming the organic film contains a silane coupling agent.

In one embodiment of the invention, the silane coupling agent includes at least one of hexamethyl disilazane, dimethyl diethoxy silane, and n-buthyl trimethoxy.

In one embodiment of the invention, the method further includes the step of, before the formation of the pixel electrode, ashing the surface of the interlayer insulating film by an oxygen plasma.

In one embodiment of the invention, the ashing step is conducted after the formation of the contact holes.

In one embodiment of the invention, the interlayer insulating film includes a thermally curable material and the interlayer insulating film is cured be fore the ashing step.

In one embodiment of the invention, the thickness of the ashed portion of the interlayer insulating film is in the range of about 100 to 500 nm.

In one embodiment of the invention, the thickness of the pixel electrode is about 50 nm or more.

In one embodiment of the invention, the interlayer insulating film is formed by developing the photosensitive transparent acrylic resin with tetramethyl ammonium hydroxyoxide developing solution with a concentration of about 0.1 mol % to about 1.0 mol %.

In one embodiment of the invention, the method further includes the step of, after the formation of the contact holes through the interlayer insulating film, decoloring the interlayer insulating film by irradiating the interlayer insulating film with ultra-violet light.

In one embodiment of the invention, the method further includes the step of, before the formation of the organic film, forming a silicon nitride film on a surface of the substrate where the organic film is to be formed.

Thus, the invention described herein makes possible the advantage of (1) providing a transmission type liquid crystal display device where flat pixel electrodes overlap respective lines to improve the aperture ratio of the-liquid crystal display, minimize disturbance in the orientation of liquid crystal molecules, and simplify the fabrication process. Furthermore, and the influence of the capacitance between the pixel electrodes and the lines appearing on the display, such as crosstalk, can be reduced to achieve a good display. The invention described herein also makes possible the advantage of (2) providing a method for fabricating such a transmission type liquid crystal display device.

These and other advantages of the present invention will become apparent to those skilled in the art upon reading and understanding the following detailed description with reference to the accompanying figures.

BRIEF DESCRIPTION OF THE DRAWINGS

FIG. 8 is a graph illustrating the relationship between the liquid crystal capacitance ratio and the overlap width for the transmission type liquid crystal display device of Example 5.

DESCRIPTION OF THE PREFERRED EMBODIMENTS

The present invention will be described by way of examples with reference to the accompanying drawings.

EXAMPLE 1

Figure 1:
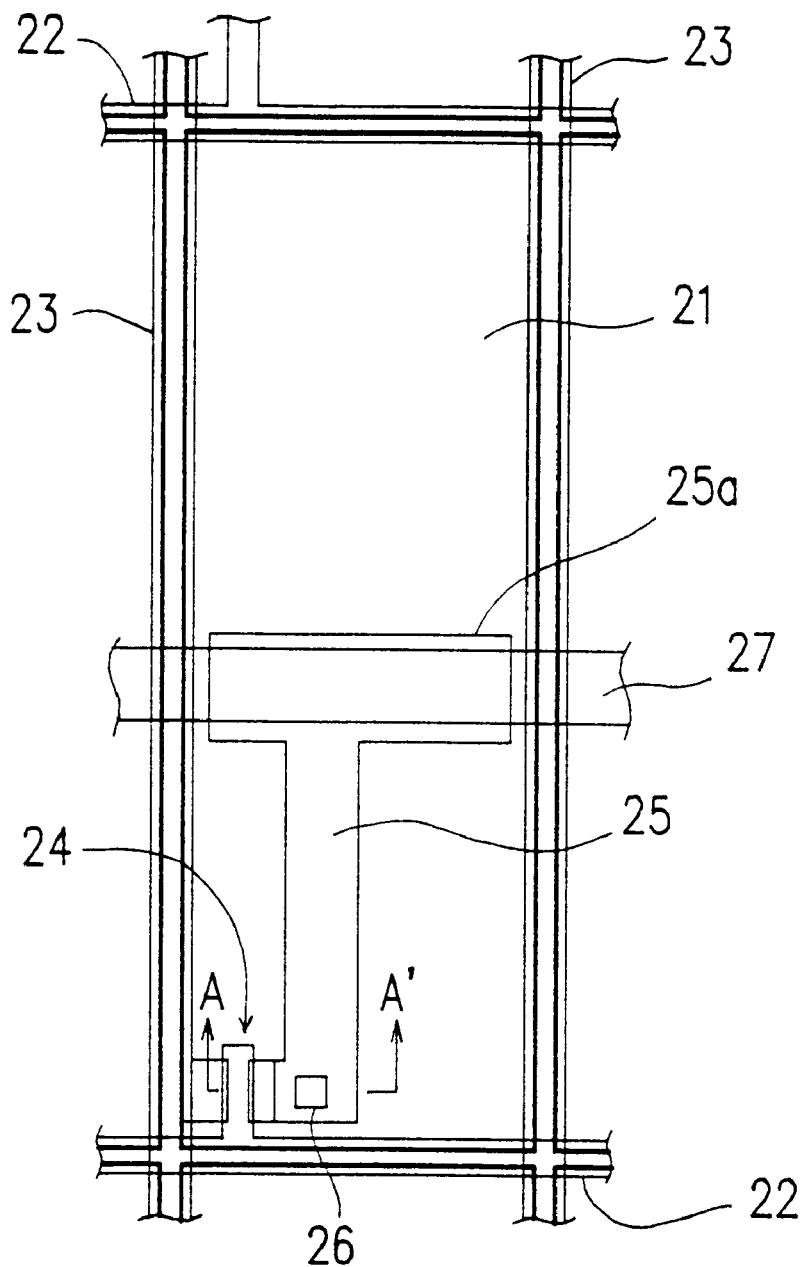
FIG. 1 is a plan view of a one-pixel portion of an active matrix substrate of a transmission type liquid crystal display device of Example 1 according to the present invention.

FIG. 1 is a plan view of a one-pixel portion of an active matrix substrate of the transmission type liquid crystal display device of Example 1 according to the present invention.

Figure 16:
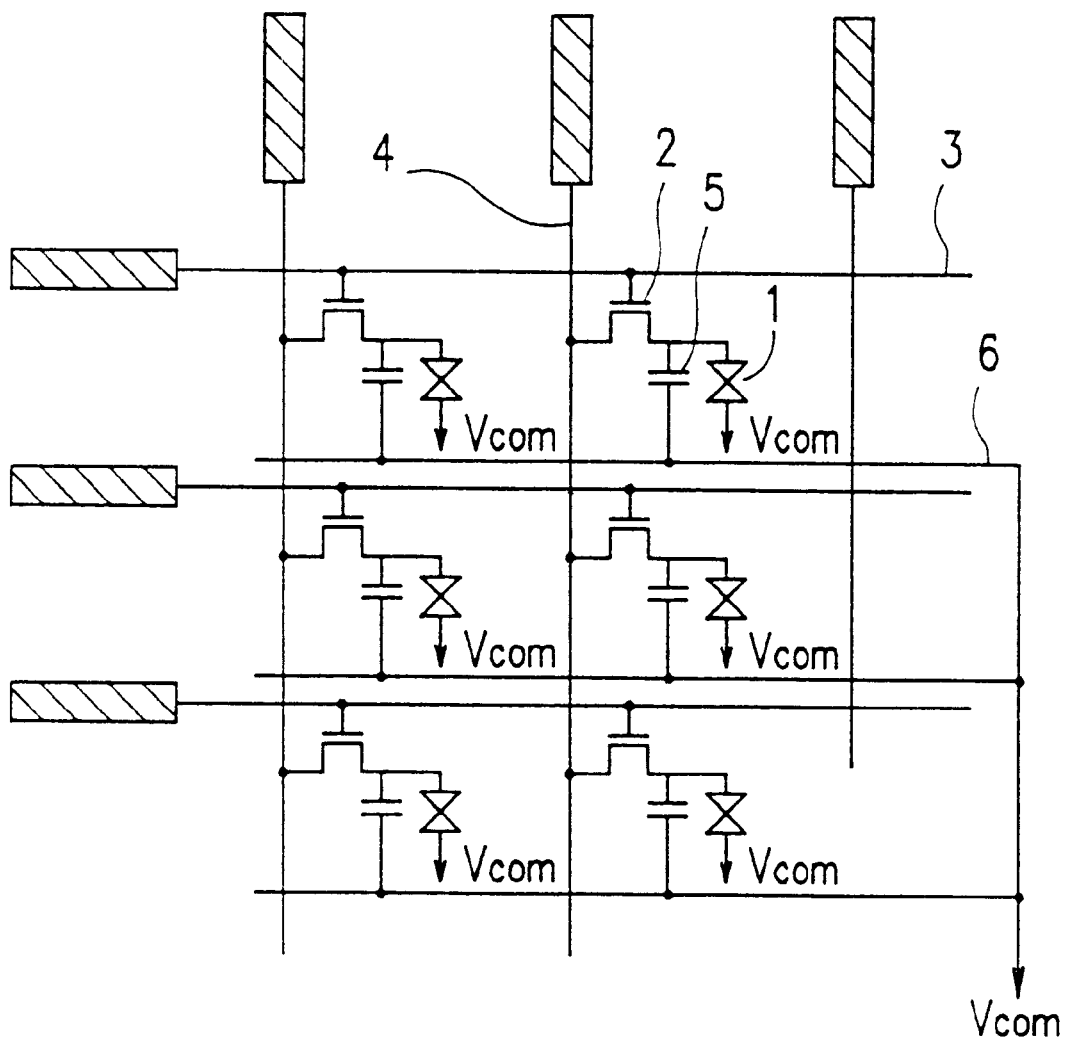
FIG. 16 is a circuit diagram of a conventional liquid crystal display device provided with an active matrix substrate.
Figure 17:
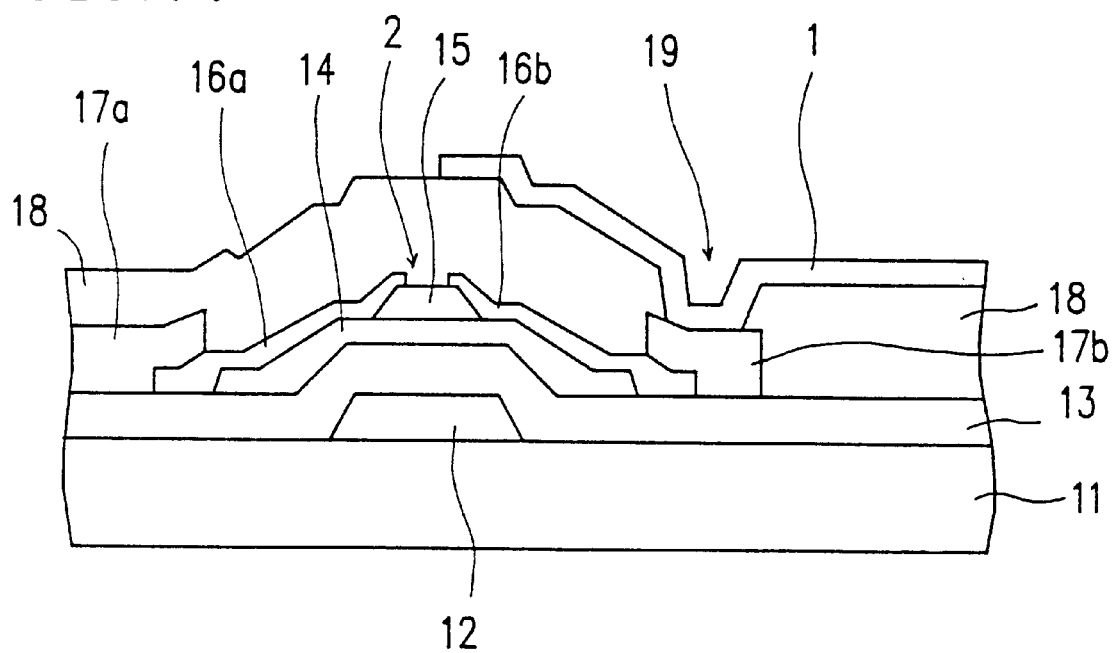
FIG. 17 is a sectional view of a one-pixel portion of the active matrix substrate of the conventional liquid crystal display device.

Referring to FIG. 1, the active matrix substrate includes a plurality of pixel electrodes 21 (within a bold line) arranged in a matrix. Gate lines 22 for supplying a scanning (gate) signal and source lines 23 for supplying an image (data) signal and source surround the peripheries of the pixel electrodes 21 and cross each other. The peripheries of each pixel electrode 21 overlap the gate lines 22 and the source lines 23. A TFT 24 acting as a switching element connected to the corresponding pixel electrode 21 is formed at a crossing of the gate line 22 and the source line 23. A gate electrode of the TFT 24 is connected to the gate line 22 so that a gate signal can be input into the gate electrode to control the driving of the TFT 24. A source electrode of the TFT 24 is connected to the source line 23 so that a data signal can be input into the source electrode. A drain electrode of the TFT 24 is connected to the pixel electrode 21 via a connecting electrode 25 and a contact hole 26. The drain electrode is also connected to an electrode of a storage capacitor (a storage capacitor electrode 25a) via the connecting electrode 25. The other electrode of the storage capacitor, a storage capacitor counter electrode 27, is connected to a common line (element 6 in FIG. 16).

Figure 2:
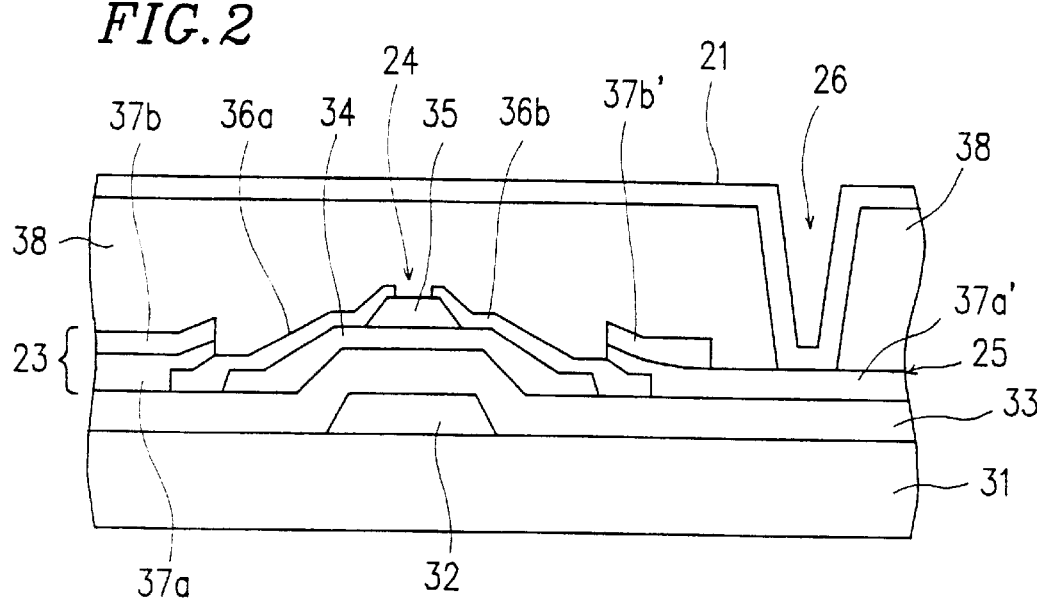
FIG. 2 is a sectional view taken along line A-A' of FIG. 1.

FIG. 2 is a sectional view of the active matrix substrate taken along line A-A' of FIG. 1.

Referring to FIG. 2, a gate electrode 3 2 connected to the gate line 22 shown in FIG. 1 is formed on a transparent insulating substrate 31. A gate insulating film 33 is formed covering the gate electrode 32. A semiconductor layer 34 is formed on the gate insulating film 33 so as to overlap the gate electrode 32 via the gate insulating film 33, and a channel protection layer 35 is formed on the center of the semiconductor layer 34. $n^+$-Si layers as a source electrode 36a and a drain electrode 36b are formed covering the end portions of the channel protection layer 35 and portions of the semiconductor layer 34, so that they are separated from each other by a portion of the channel protection layer 35. A transparent conductive film 37a and a metal layer 37b which are to be the double-layer source line 23 shown in FIG. 1 are formed to overlap the source electrode 36a as one of the $n^+$-Si layers. A transparent conductive film 37a' and a metal layer 37b' are formed to overlap the drain electrode 36b as the other $n^+$-Si layer. The transparent conductive film 37a' extends to connect the drain electrode 36b and the pixel electrode 21 and also serves as the connecting electrode 25 which is connected to the storage capacitor electrode 25a of the storage capacitor. An interlayer insulating film 38 is formed covering the TFT 24, the gate line 22, the source line 23, and the connecting electrode 25.

A transparent conductive film is formed on the interlayer insulating film 38 to constitute the pixel electrode 21. The pixel electrode 21 is connected to the drain electrode 36b of the TFT 24 via the contact hole 26 formed through the interlayer insulating film 38 and the transparent conductive film 37a' which is the connecting electrode 25.

The active matrix substrate with the above structure is fabricated as follows.

First, the gate electrode 32, the gate insulating film 33, the semiconductor layer 34, the channel protection layer 35, and the $n^+$-Si layers as the source electrode 36a and the drain electrode 36b are sequentially formed in this order on the transparent insulating substrate 31 such as a glass substrate. This film formation step can be conducted following a conventional method for fabricating an active matrix substrate.

Thereafter, the transparent conductive films 37a and 37a' and the metal layers 37b and 37b' constituting the source line 23 and the connecting electrode 25 are sequentially formed by sputtering and are patterned into a predetermined shape.

A photosensitive acrylic resin is applied to the resultant substrate to a thickness of 3 $\mu$m, for example, by spin coating to form the interlayer insulating film 38. The resultant resin layer is exposed to light according to a predetermined pattern and developed with an alkaline solution. Only portions of the resin layer exposed to light are etched with the alkaline solution, forming the contact holes 26 through the interlayer insulating film 38.

Subsequently, a transparent conductive film is formed on the resultant substrate by sputtering and is patterned to form the pixel electrodes 21. Each pixel electrode 21 is thus connected to the corresponding transparent conductive film 37a' which is in contact with the drain electrode 36b of the TFT 24 via the contact hole 26 formed through the interlayer insulating film 38. In this way, the active matrix substrate of this example is fabricated.

The thus-fabricated active matrix substrate includes the thick interlayer insulating film 38 between the pixel electrode 21 and the underlying layers including the gate line 22, the source line 23, and the TFT 24. With this thick interlayer insulating film, it is possible to overlap the pixel electrode 21 with the gate and source lines 22 and 23 and the TIT 24. Also, the surface of the pixel electrode 21 can be made flat. As a result, when the transmission type liquid crystal display device including the thus-fabricated active matrix substrate and a counter substrate with a liquid crystal layer therebetween is completed, the aperture ratio of this device can be improved. Also, since the electric field generated at the lines 22 and 23 can be shielded, the occurrence of disclination can be minimized.

The acrylic resin constituting the interlayer insulating film 38 has a dielectric constant of 3.4 to 3.8 which is lower than that of an inorganic film (e.g., the dielectric constant of silicon nitride is 8) and a high transparency. Also, since the spin coating is employed, a thickness as large as 3 $\mu$m can be easily obtained. This reduces the capacitances between the gate line 22 and the pixel electrode 21 and between the source lines 23 and the pixel electrodes 21, lowering the time constant. As a result, the influence of the capacitances between the lines 22 and 23 and the pixel electrode 21 appearing on the display, such as crosstalk, can be reduced, and thus a good and bright display can be obtained.

The contact hole 26 can be formed into a sharp tapered shape by the patterning including the exposure to light and the alkaline development. This facilitates a better connection between the pixel electrode 21 and the transparent conductive film 37a'.

Further, since the photosensitive acrylic resin is used, the thick film having a thickness of several micrometers can be easily formed by spin coating. No photoresist process is required at the patterning step. This is advantageous in production. Though the acrylic resin used as the interlayer insulating film 38 is colored before the coating, it can be made transparent optically by exposing the entire surface to light after the patterning step. The resin can also be made transparent chemically.

In this example, the photosensitive resin used as the interlayer insulating film 38 is, in general, exposed to light from a mercury lamp including the emission spectrum of the i line (wavelength: 365 nm), an h line (wavelength: 405 nm), and a g line (wavelength: 436 nm). The i line has the highest energy (i.e., the shortest wavelength) among these emission lines, and therefore it is desirable to use a photosensitive resin having a reactive peak (i.e., absorption peak) at the i line. This makes it possible to form the contact holes with high precision, and moreover, since the peak is farthest from the visible light, coloring caused by the photosensitive agent can be minimized. A photosensitive resin reactive to ultraviolet light having short wavelength emitted from an excimer laser can also be used. By using such an interlayer insulating film substantially free from coloring, the transmittance of the resultant transmission type liquid crystal display device can be increased. Accordingly, the brightness of the liquid crystal display can be increased or the power consumption of the liquid crystal display can be reduced by saving the amount of light needed from a backlight.

Since the thickness of the interlayer insulating film 38 is as large as several micrometers, thicker than that in conventional liquid crystal display, a resin with a transmittance as high as possible is preferably used. The visual sensitivity of a human eye for blue is a little lower than those for green and red. Accordingly, even if the spectral transmittance of the film has slightly lower transmittance for blue light than that for green and red light, the display quality will be not substantially deteriorated. Though the thickness of the interlayer insulating film 38 was made 3 $\mu$m in this example, it is not limited to 3 $\mu$m. The thickness of the interlayer insulating film may be set depending on the transmittance and the dielectric constant of the film. In order to reduce the capacitance, the thickness is preferably equal to or grater than about 1.5 $\mu$m, more preferably equal to or grater than about 2.0 $\mu$m.

In this example, the transparent conductive film 37a' is formed as the connecting electrode 25 connecting the drain electrode 36b of each TFT 24 and the corresponding pixel electrode 21. This is advantageous in the following points. In the conventional active matrix substrate, the connecting electrode is composed of a metal layer. When such a metal connecting electrode is formed in the aperture portion, the aperture ratio is lowered. In order to overcome this problem, the connecting electrode is conventionally formed above the TFT or the drain electrode of the TFT. The contact hole is formed above the connecting electrode through the interlayer insulating film to connect the drain electrode of the TFT and the pixel electrode. With this conventional structure, however, when the TFT is made smaller to improve the aperture ratio, for example, it is not possible to accommodate the entire contact hole above the smaller TFT. As a result, the aperture ratio is not improved. When the thickness of the interlayer insulating film is made as large as several micrometers, the contact hole should be tapered in order to connect the pixel electrode and the underlying connecting electrode, and a large-size connecting electrode is required in the TFT region. For example, when the diameter of the contact hole is 5 $\mu$m, the size of the connecting electrode should be about 14 $\mu$m in consideration of the tapered contact hole and the alignment allowance. In the conventional active matrix substrate, if a TFT with a size smaller than this value is realized, the oversized connecting electrode causes a new problem of lowering the aperture ratio. In contrast, in the active matrix substrate of this example, since the connecting electrode 25 is composed of the transparent conductive film 37a', no trouble of lowering the aperture ratio arises. Further, in this example, the connecting electrode 25 extends to connect the drain electrode 36b of the TFT and the storage capacitor electrode 25a of the storage capacitor formed by the transparent conductive film 37a'. Since the extension is also formed of the transparent conductive film 37a', it does not lower the aperture ratio, either.

In this example, the source line 23 is of a double-layer structure composed of the transparent conductive layer 37a and the metal layer 37b. If part of the metal layer 37b is defective, the source line 23 can remain electrically conductive through the transparent conductive film 37a, so that the occurrence of disconnection of the source line 23 can be reduced.

EXAMPLE 2

In Example 2, another method for forming the interlayer insulating film 38 will be described.

The fabrication process until the transparent conductive films 37a and 37a' and the metal layers 37b and 37b' are formed by sputtering and patterned is the same as that described in Example 1. Then, in this example, a non-photosensitive organic thin film, is formed on the resultant structure by spin coating. A photoresist is then formed on the thin film and patterned. Using the patterned photoresist, the organic thin film is etched to obtain the interlayer insulating film 38 and the contact holes 26 formed through the interlayer insulating film 38. Alternatively, the non-photosensitive organic thin film may be formed by a CVD, instead of spin coating.

Examples of the non-photosensitive organic thin film include a thermally curable acrylic resin. More specifically, JSS-924 (2-component system acrylic resin) and JSS-925 (1-component system acrylic resin) manufactured by Japan Synthetic Rubber Co., Ltd. can be used. These resins generally have a heat resistance of 280° C. or more. Using a non-photosensitive resin for the interlayer insulating film allows for freer resin design. For example, polyimide resin can be used. Examples of transparent and colorless polyimide resin include polyimides obtained by the combination of acid anhydrides such as 2,2-bis(dicarboxyphenyl) hexafluoropropylene acid anhydride, oxydiphthalic acid anhydride, and biphenyl tetracaboxylic acid anhydride, with meta-substituted aromatic diamines having a sulfone group and/or an ether group or diamines having a hexafluoropropylene group. These polyimide resins are disclosed in Fujita, et al., Nitto Giho, Vol. 29, No. 1, pp. 20–28 (1991), for example. Among the above transparent and colorless polyimide resins, a resin containing both acid anhydride and diamine each having a hexafluoropropylene group has a high transparency. Fluoric resins other than the above fluoric polyimides can also be used. Fluoric materials have not only excellent colorless transparency but also a low dielectric constant and high heat resistance.

A photoresist containing silicon is preferably used as the photoresist for the patterning of the interlayer insulating film made of a non-photosensitive organic material. In the above etching, dry etching is normally conducted using a gas containing $CF_4$, $CF_3H$, $SF_6$ and the like. In this case, however, since the photoresist and the interlayer insulating film are both organic resins, it is difficult to increase the selection ratio between these resins. This is especially true in the case where the thickness of the interlayer insulating film is as large as 1.5 μm or more which is nearly the same as that of the photoresist, as in this example. It is preferable that the materials have sufficiently different etching rates (i.e., selectivity). When an acrylic resin is used as the interlayer insulating film in combination with a common photoresist material (e.g., OFPR-800 produced by Tokyo Ohka Kogyo Co., Ltd.) is used, for example, the selection ratio is about 1.5. In contrast, in this example, by using the photoresist containing silicon, a selectivity with respect to the photosensitive acrylic resin of about 2.0 or more can be obtained. Therefore, patterning with high precision is attained.

Alternatively, at the formation of the interlayer insulating film by the patterning using a photoresist which does not contain silicon, a silane coupling agent (e.g., hexamethyl disilazane) may be applied to the photoresist and the silane coupling agent layer is treated with oxygen plasma to form a silicon oxide film. As a result, the etching rate of the photoresist is reduced, since the silicon oxide film on the photoresist serves as a protection film. This method can be used in combination with the silicon containing photoresist.

The increase in the selection ratio by the above mentioned method utilizing a silicon element is especially effective in the dry etching using a gas containing $CF_4$, $CF_3H$ or $SF_6$.

The active matrix substrate with the thus-formed interlayer insulating film 38 can also provide a high aperture ratio, as in Example 1.

The non-photosensitive organic thin film used as the interlayer insulating film 38 in this example has a low dielectric constant and a high transparency. The thickness can be as large as 3 μm. With the low dielectric constant and the long distance between electrodes of the capacitance, the capacitances between the gate line 22 and the pixel electrode 21 and between the source line 23 and the pixel electrode 21 can be reduced.

EXAMPLE 3

Figure 3:
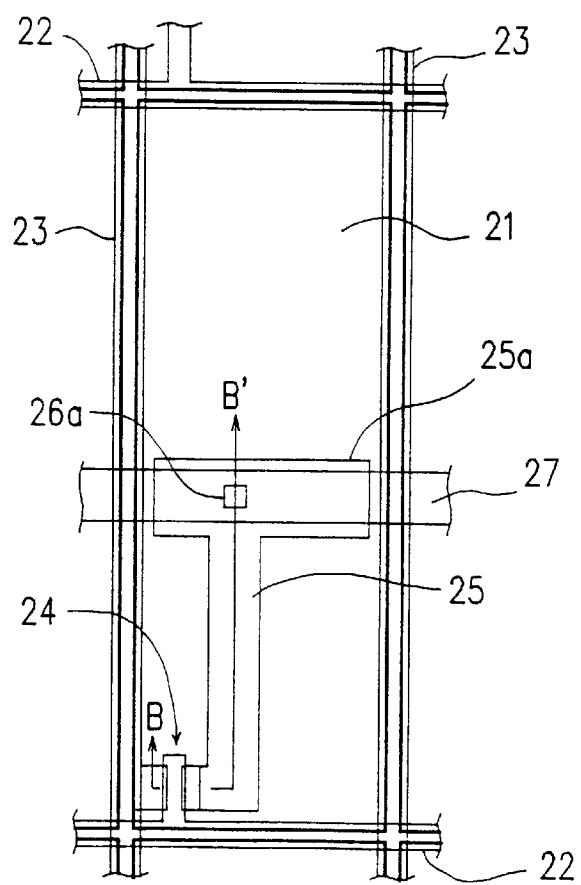
FIG. 3 is a plan view of a one-pixel portion of an active matrix substrate of a transmission type liquid crystal display device of Example 3 according to the present invention.
Figure 4:
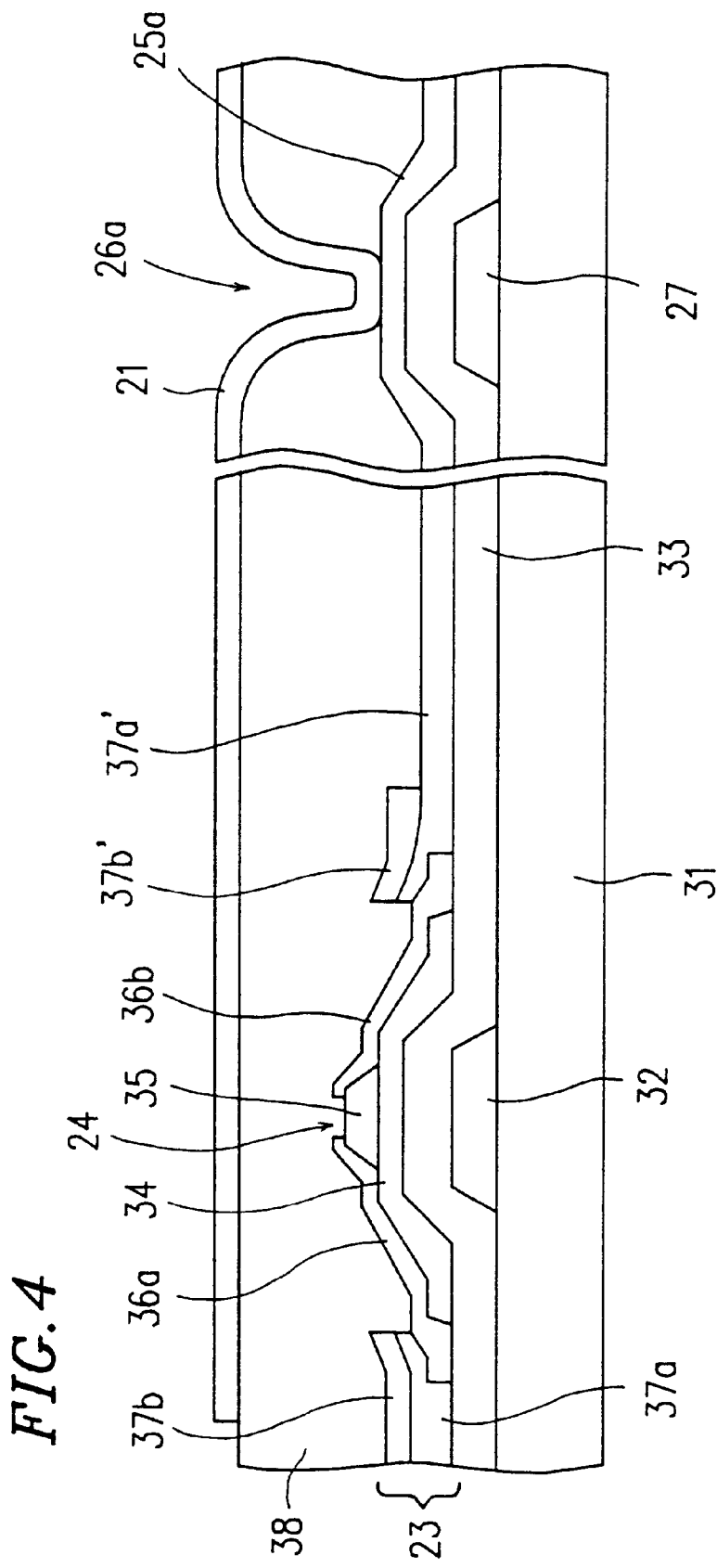
FIG. 4 is a sectional view taken along line B-B' of FIG. 3.

FIG. 3 is a plan view of a one-pixel portion of an active matrix substrate of the transmission type liquid crystal display device of Example 3 according to the present invention. FIG. 4 is a sectional view taken along line B-B' of FIG. 3. Components having like functions and effects are denoted by the same reference numerals as those in FIGS. 1 and 2, and the description thereof is omitted.

In the active matrix substrate of this example, each contact hole 26a is formed above the storage capacitor electrode 25a and the storage capacitor counter electrode 27 of the storage capacitor of each pixel. As described in Example 1, the storage capacitor electrode 25a constitutes the end portion of the connecting electrode 25 which is connected to the drain electrode 36b of the TFT 24. The other electrode of the storage capacitor, the storage capacitor counter electrode 27, is connected to a counter electrode formed on a counter substrate via the storage capacitor common line 6 shown in FIG. 16. In other words, the contact holes 26a are formed above the storage capacitor common line 6 which is composed of a light-shading metal film.

The above structure of the active matrix substrate of this example has the following advantages.

Since the thickness of the interlayer insulating film 38 is as large as 3 μm, for example, which is well comparable with the thickness of a liquid crystal cell of 4.5 μm, light leakage tends to occur around the contact holes 26a due to a disturbance in the orientation of the liquid crystal molecules. If the contact holes 26a are formed in the aperture portions of the transmission type liquid crystal display device, the contrast is lowered due to the light leakage. On the other hand, the active matrix substrate of this example is free from this trouble because each contact hole 26a is formed above the storage capacitor electrode 25a and the storage capacitor counter electrode 27 as an end portion of the storage capacitor common line 6 composed of a light-shading metal film. In other words, as long as the contact hole 26a is formed above the storage capacitor common line 6 composed of a light-shading metal film, not in the aperture portion, any light leakage which may occur around the contact hole 26a due to a disturbance in the orientation of the liquid crystal molecules will not result in lowering of the contrast. This also applies to the case where the storage capacitor is formed using a portion of the adjacent gate line 22 as one of electrodes thereof. In this case, the contact hole 26a is formed above the light-shading gate line 22 and thus lowering of the contrast can be prevented.

In the active matrix substrate of this example, the connecting electrode 25 for connecting the drain electrode 36b of the TFT 24 and the contact hole 26a is composed of the transparent conductive film 37a'. Accordingly, the aperture ratio does not become lower by forming the contact hole 26a above the storage capacitor.

Thus, in this example, since the storage capacitor counter electrode 27 formed under the contact hole 26a shades light, light leakage which may occur due to a disturbance in the orientation of the liquid crystal molecules does not influence the display. The size of the contact hole 26a is not necessarily so precise, allowing the hole to be larger and smoother. As a result, the pixel electrode 21 formed on the interlayer insulating film 38 is continuous, not being interrupted by the contact hole 26a. This improves the production yield.

EXAMPLE 4

Figure 5:
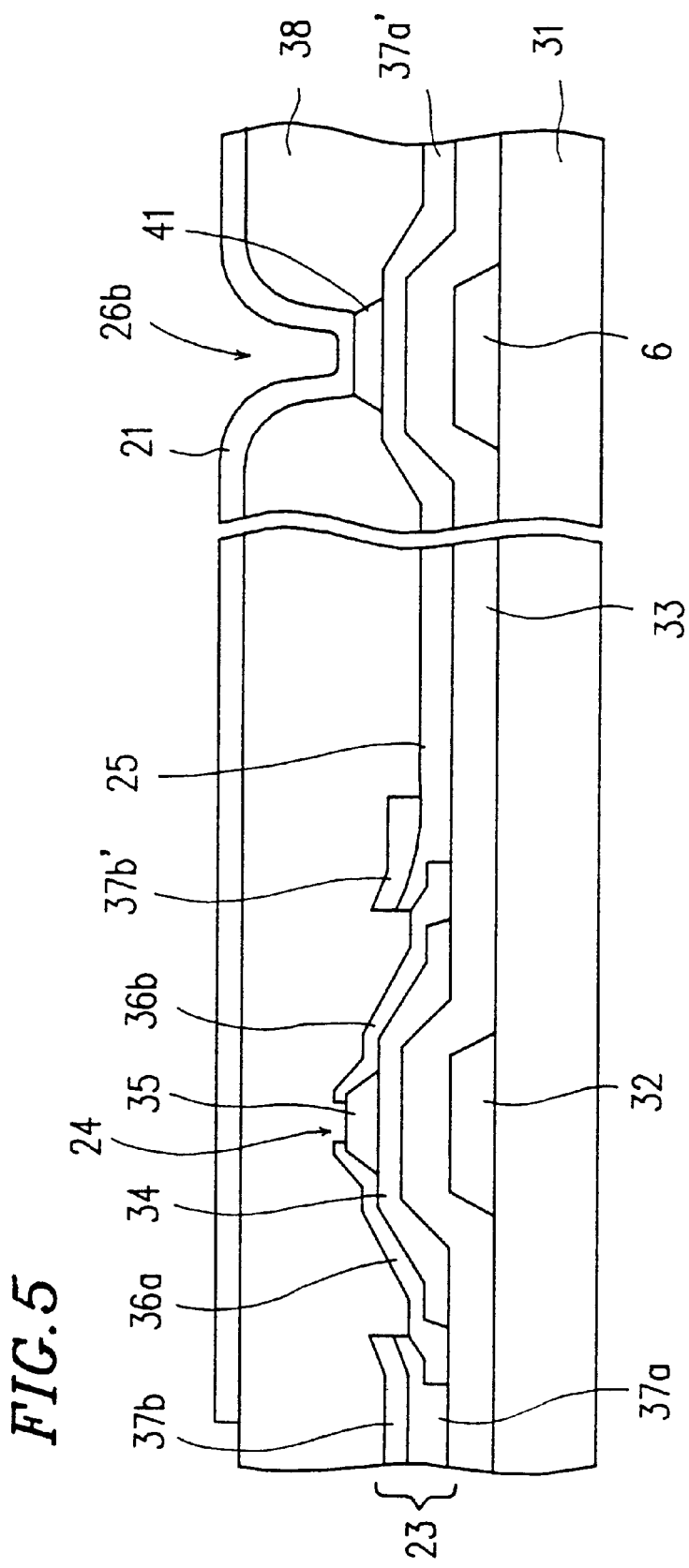
FIG. 5 is a partial sectional view of an active matrix substrate of a transmission type liquid crystal display device of Example 4 according to the present invention.

FIG. 5 is a partial sectional view of an active matrix substrate of the transmission type liquid crystal display device of Example 4 according to the present invention. Components having like functions and effects are denoted by the same reference numerals as those in FIGS. 1 to 4, and the description thereof is omitted.

In the active matrix substrate of this example, each contact hole 26b is formed through the interlayer insulating film 38 above the storage capacitor common line 6. A metal nitride layer 41 is formed on the portion of the transparent conductive film 37a' under each contact hole 26b.

The above structure of the active matrix substrate of this example is advantageous in the following point.

Some troubles arise in the adhesion between the resin used for the interlayer insulating film 38 and ITO (indium tin oxide) used for the transparent conductive film or metal such as Ta and Al. For example, in the cleaning process after the formation of the contact hole 26b, a cleaning solvent tends to permeate from the contact hole into the interface between the resin and the underlying transparent conductive film, causing the resin film to peel from the transparent conductive film. In order to overcome this trouble, according to the active matrix substrate of this example, the metal nitride layer 41 made of TaN, AlN, and the like which have good adhesion with the resin is formed on the transparent conductive film under the contact hole. Accordingly, the peeling of the resin film and other troubles in the adhesion can be prevented.

Any material can be used for the metal nitride layer 41 as long as it has good adhesion with the resin constituting the interlayer insulating film 38, ITO and the like constituting the transparent conductive film 37a', and metal such as Ta and Al. Such a material should also be electrically conductive to electrically connect the transparent conductive film 37a' and the pixel electrode 21.

EXAMPLE 5

In Example 5, a method for driving the transmission type liquid crystal display device according to the present invention will be described.

In the transmission type liquid crystal display device according to the present invention, each pixel electrode overlaps the corresponding lines via the interlayer insulating film. If the pixel electrode does not overlap the corresponding lines but gaps are formed therebetween, regions where no electric field is applied are formed in the liquid crystal layer. This trouble can be avoided by overlapping the pixel electrode with the lines. The electric field also is not applied to the regions of the liquid crystal layer corresponding to the boundaries of the adjacent pixel electrodes. However, light leakage which may occur at these regions can be blocked by the existence of lines. This eliminates the necessity of forming a black mask on a counter substrate in consideration of an error at the lamination of the active matrix substrate and the counter substrate. This improves the aperture ratio. Also, since the electric field generated at the lines can be shielded, disturbances in the orientation of the liquid crystal molecules can be minimized.

The overlap width should be set in consideration of a variation in the actual fabrication process. For example, it is preferably about 1.0 μm or more.

Crosstalk occurs due to the capacitance between the pixel electrode and the source line when the pixel electrode overlaps the source line as described above. This lowers the display quality of the resultant transmission type liquid crystal display device. In particular, in a liquid crystal panel used for a notebook type personal computer where pixels are arranged in a vertical stripe shape, the display is greatly influenced by the capacitance between the pixel electrode and the source line. This is considered to be due to the following reasons: (1) The capacitance between the pixel electrode and the source line is relatively large since, in the vertical stripe arrangement, the shape of the pixel electrode is rectangular having the side along the source line as the major side; (2) Since the display color is different between adjacent pixels, there is little correlation between signals transmitted on the adjacent source lines. Thus, the influence of the capacitance cannot be cancelled between the adjacent source lines.

According to the transmission type liquid crystal display device of the present invention, the interlayer insulating film which is composed of an organic thin film has a small dielectric constant and can be easily thicker. Therefore, the capacitances between the pixel electrodes and the lines can be reduced, as described above. In addition to this feature, according to the method for driving the transmission type liquid crystal display device of this example, the influence of the capacitance between the pixel electrode and the source line can be reduced to minimize vertical crosstalk which occurs in notebook type personal computers.

The method of this example includes driving the transmission type liquid crystal display device by inverting the polarity of the data signal for every horizontal scanning period (hereinafter, this method is referred to as "1H inversion driving").

Figure 6:
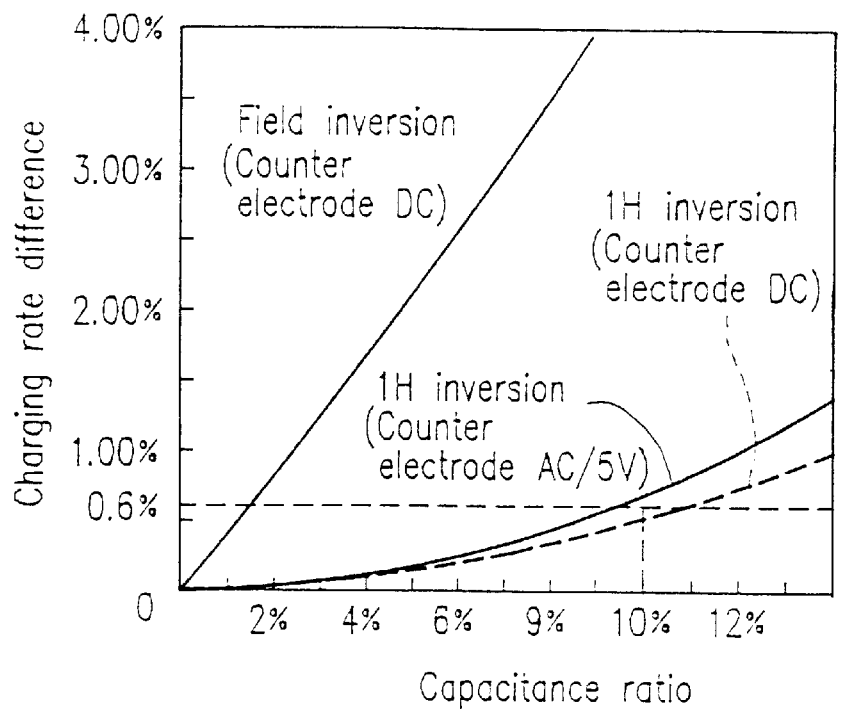
FIG. 6 is a graph illustrating the relationship between the liquid crystal charging rate difference and the capacitance ratio for transmission type liquid crystal display devices of Examples 5 and 6 and a conventional liquid crystal display device.
Figure 7A:
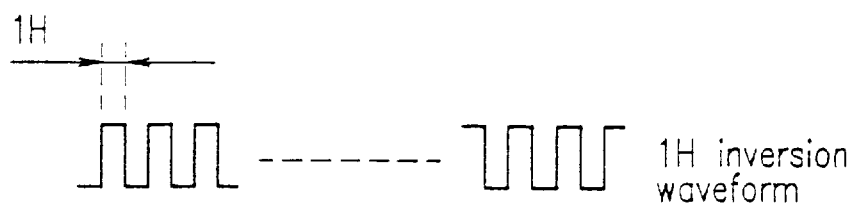
FIGS. 7A and 7B are waveforms of data signals in the cases of 1 H inversion driving in Examples 5 and 6 and conventional field inversion driving, respectively.
Figure 7B:
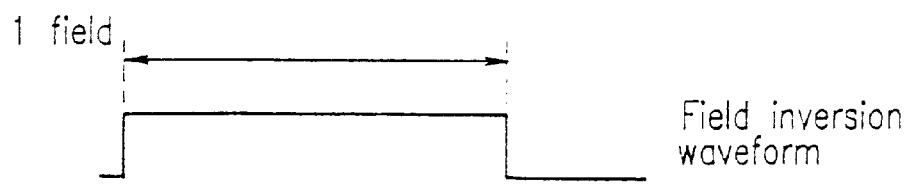

FIG. 6 shows the influences of the capacitance between the pixel electrode and the source line upon the charging rate of the pixel in the cases of the 1H inversion driving and a driving method where the polarity of the data signal is inverted every field (hereinafter, this method is referred to as "field inversion driving"). FIGS. 7A and 7B show the waveforms obtained by the 1H inversion driving and the field inversion driving, respectively.

In FIG. 6, the Y axis represents the charging rate difference which indicates the ratio of the effective value of the voltage applied to the liquid crystal layer in the gray scale display portion when the gray scale is uniformly displayed to that when a black window pattern is displayed in the gray scale display at a vertical occupation of 33%. The X axis represents the capacitance ratio which is proportional to the variation in the voltage of the pixel electrode caused by the capacitance between the pixel electrode and the source line, which is represented by expression (1) below:

$$\text{Capacitance ratio} = C_{sd}/(C_{sd}+C_{ls}+C_s) \quad (1)$$

wherein $C_{sd}$ denotes the capacitance value between the pixel electrode and the source line, $C_{ls}$ denotes the capacitance value of the liquid crystal portion corresponding to each pixel at the gray scale display, and C. denotes the capacitance value of the storage capacitor of each pixel. The gray scale display refers to the display obtained when the transmittance is 50%.

As is observed from FIG. 6, in the 1H inversion driving of this example, the influence of the capacitance between the pixel electrode and the source line upon the effective voltage actually applied to the liquid crystal layer can be reduced to one-fifth to one-tenth of that obtained in the field inversion driving when the capacitance value is the same. This is because, in the 1H inversion driving, the polarity of the data signal is inverted at intervals sufficiently shorter than the period of one field during one field. This results in cancelling the influences of the positive signal and the negative signal on the display with each other.

A display test was conducted using a VGA panel with a diagonal of 26 cm. From this test, it was observed that crosstalk was eminent when the charging rate difference was 0.6% or more, degrading the display quality. This is shown by the dotted curve in FIG. 6. From the curve in FIG. 6, it is found that the capacitance ratio should be 10% or less in order to obtain the charging rate difference of 0.6% or less.

FIG. 8 shows the relationships between the overlap amount between the pixel electrode and the source line and the capacitance between the pixel electrode and the source line when the thickness of the interlayer insulating film is used as a parameter. The VGA panel with a diagonal of 26 cm was also used in this test. In the test, the acrylic photosensitive resin (dielectric constant: 3.4) used in Example 1 was used as the interlayer insulating film. In consideration of the processing precision, the overlap width between the pixel electrode and the source line should be at least 1 μm. From FIGS. 6 and 8, it is found that the thickness of the interlayer insulating film should be 2.0 μm or more to satisfy the overlap width of 1 μm and the charging rate difference of 0.6% or less.

Thus, according to the 1H inversion driving of this example, a good display free from vertical crosstalk can be obtained without inverting the polarity of the signal on the adjacent source lines (source line inversion driving) when the pixel electrode overlaps the source line. This method is therefore applicable to notebook type personal computers.

It has also been found that a dot inversion driving has similar effects to those obtained by the IH inversion driving. The dot inversion driving is a driving method where signals of the opposite polarities are input into pixel electrodes adjacent each other in the transverse direction and also the polarity is inverted every horizontal scanning period. A source line inversion driving is also effective when the capacitance ratio is sufficiently low as in the above case. Further, even in the color display operation where adjacent signals are not highly correlated with each other, colored crosstalk may be suppressed, since the capacitance between the pixel electrode and the source line is sufficiently reduced according to the present invention.

EXAMPLE 6

In Example 6, another method for driving the transmission type liquid crystal display device according to the present invention will be described. In this method, the polarity of the voltage applied to the liquid crystal layer is inverted for every horizontal scanning period, and simultaneously the signal applied to the counter electrode is driven by alternate current in synchronization with the inversion of the polarity of the source signal. This AC driving of the counter electrode can minimize the amplitude of the source signal.

FIG. 6 described in Example 5 also shows the curve obtained when the counter electrode is AC driven with an amplitude of 5 V. From FIG. 6, it is observed that, since the 1H inversion driving is employed, the charging rate difference is sufficiently small compared with the case of the field inversion driving, though it is larger by about 10 percent than that obtained in Example 5 due to the AC driving of the counter electrode in this example. As a result, a good display without vertical crosstalk can be realized in the driving method of this example, as in the previous example.

EXAMPLE 7

Figure 9:
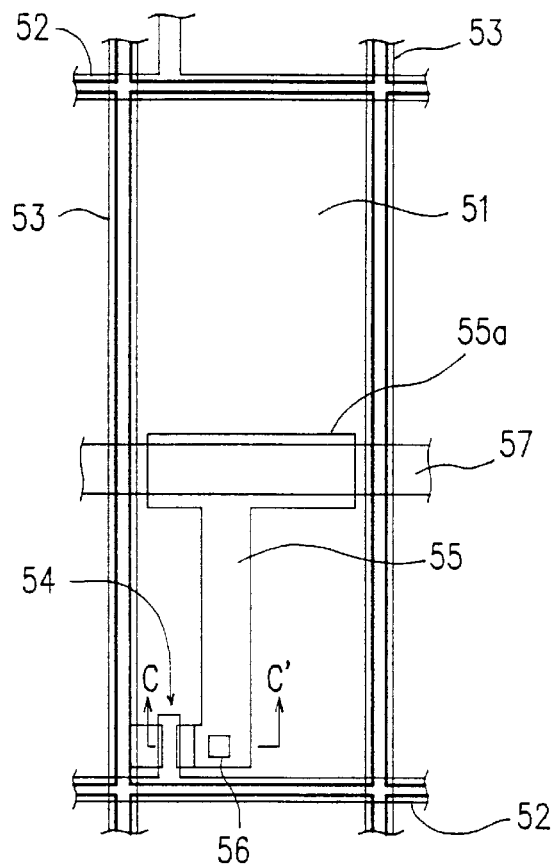
FIG. 9 is a plan view of a one-pixel portion of an active matrix substrate of a transmission type liquid crystal display device of Example 7 according to the present invention.

FIG. 9 is a plan view of a one-pixel portion of an active matrix substrate of the transmission type liquid crystal display device of Example 7.

In the transmission type liquid crystal display device of this example, each flat pixel electrode overlaps corresponding lines to improve the aperture ratio of the liquid crystal display, minimize disturbances in the orientation of the liquid crystal molecules, and simplify the fabrication process. Also, the influence of the capacitances between the pixel electrode and the lines appearing on the display, such as crosstalk, is minimized thereby achieving a good display. In this example, an interlayer insulating film with high transparency can be obtained. After the light exposure and development of the interlayer insulating film, the entire substrate is exposed to light to react the remaining unnecessary photosensitive agent contained in the photosensitive transparent acrylic resin.

Referring to FIG. 9, the active matrix substrate includes a plurality of pixel electrodes 51 arranged in a matrix. Gate lines 52 and source lines 53 run along the peripheries of the pixel electrodes 51 to cross each other. The peripheries of each pixel electrode 51 overlap the gate lines 52 and the source lines 53. A TFT 54 as a switching element connected to the corresponding pixel electrode 51 is formed at a crossing of the gate line 52 and the source line 53. A gate electrode of the TFT 54 is connected to the gate line 52 so that a gate signal is input into the gate electrode to control the driving of the TFT 54. A source electrode of the TFT 54 is connected to the source line 53 so that a data signal can be input into the source electrode. A drain electrode of the TFT 54 is connected to the corresponding pixel electrode 51 via a connecting electrode 55 and a contact hole 56. The drain electrode is also connected to an electrode of a storage capacitor, a storage capacitor electrode 55a, via the connecting electrode 55. The other electrode of the storage capacitor, a storage capacitor counter electrode 57, is connected to a common line.

Figure 10:
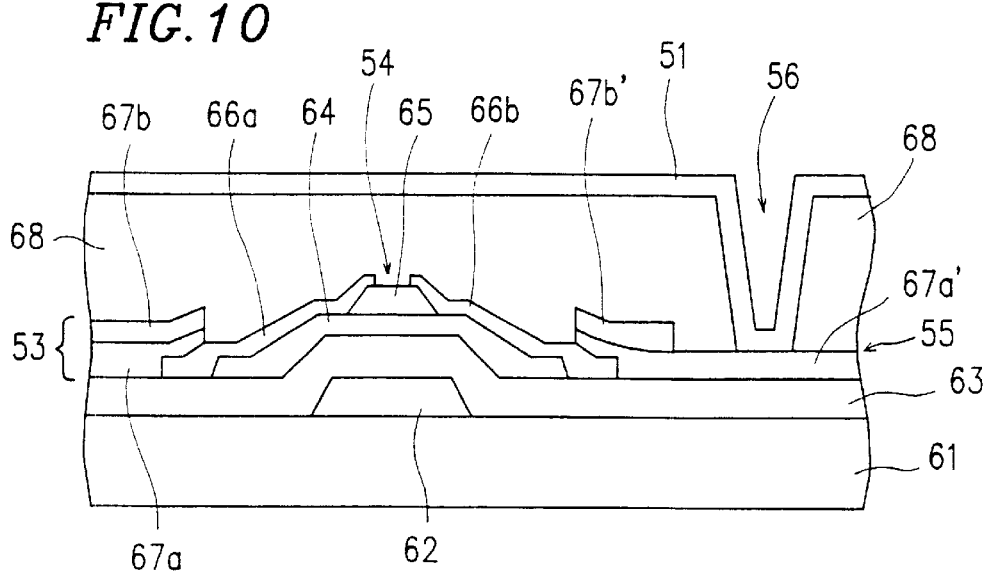
FIG. 10 is a sectional view taken along line C-C' of FIG. 9.

FIG. 10 is a sectional view of the active matrix substrate taken along line C-C' of FIG. 9.

Referring to FIG. 10, a gate electrode 62 connected to the gate line 52 shown in FIG. 9 is formed on a transparent insulating substrate 61. A gate insulating film 63 is formed covering the gate electrode 62. A semiconductor layer 64 is formed on the gate insulating film 63 so as to overlap the gate electrode 62 via the gate insulating film 63, and a channel protection layer 65 is formed on the center of the semiconductor layer 64. n$^+$-Si layers as a source electrode 66a and a drain electrode 66b are formed covering the end portions of the channel protection layer 65 and portions of the semiconductor layer 64, so that they are separated from each other at the top of the channel protection layer 65. A transparent conductive film 67a and a metal layer 67b which are to be the double-layer source line 53 shown in FIG. 9 are formed to overlap the source electrode 66a as one of the n$^+$-Si layers. A transparent conductive film 67a' and a metal layer 67b' are formed to overlap the drain electrode 66b as the other n$^+$-Si layer. The transparent conductive film 67a' extends to connect the drain electrode 66b and the pixel electrode 51 and also serves as the connecting electrode 55 which is connected to the storage capacitor electrode 55a. An interlayer insulating film 68 is formed covering the TFT 54, the gate line 52, the source line 53, and the connecting electrode 55. The interlayer insulating film 68 is made of a high-transparency acrylic resin (photosensitive transparent acrylic resin) which dissolves in a developing solution when exposed to light.

A transparent conductive film is formed on the interlayer insulating film 68 to constitute the pixel electrode 51. The pixel electrode 51 is connected to the drain electrode 66b of the TFT 54 via the contact hole 56 formed through the interlayer insulating film 68 and the transparent conductive film 67a' which is the connecting electrode 55.

The active matrix substrate with the above structure is fabricated as follows.

First, the gate electrode 62 made of Ta, Al, Mo, W, Cr, and the like, the gate insulating film 63 made of $SiN_x$, $SiO_2$, $Ta_2O_5$, and the like, the semiconductor layer (intrinsic-Si) 64, the channel protection layer 65 made of $SiN_x$, $Ta_2O_5$, and the like, the $n^+$-Si layers as the source electrode 66a and the drain electrode 66b are sequentially formed in this order on the transparent insulating substrate 61 such as a glass substrate.

Thereafter, the transparent conductive films 67a and 67a' and the metal layers 67b and 67b I made of Ta, Al, MoW, Cr, and the like constituting the source line 53 and the connecting electrode 55 are sequentially formed by sputtering and are patterned into a predetermined shape. In this example, as in the previous examples, the source line 53 is of the double-layer structure composed of the transparent conductive film 67a made of ITO and the metal film 67b. With this structure, if part of the metal layer 67b is defective, the source line 53 can remain electrically conductive through the transparent conductive film 67a, so that the occurrences of disconnection of the source line 53 can be reduced.

A photosensitive acrylic resin is applied to the resultant structure to a thickness of 2 μm, for example, by spin coating to form the interlayer insulating film 68. The resultant resin layer is exposed to light according to a predetermined pattern and developed with an alkaline solution. Only the portions exposed to light are etched with the alkaline solution, which forms the contact holes 56 through the interlayer insulating film 68.

Subsequently, a transparent conductive film is formed over the interlayer insulating film 68 and the contact holes 56 by sputtering and is patterned to form the pixel electrodes 51. Thus, each pixel electrode 51 is connected to the transparent conductive film 67a' which is in contact with the drain electrode 66b of the TFT 54 via the contact hole 56 formed through the interlayer insulating film 68. In this way, the active matrix substrate of this example is fabricated.

The interlayer insulating film 68 of Example 7 is made of a positive-type photosensitive acrylic resin, which is a photosensitive transparent acrylic resin with high transparency which dissolves in a developing solution after exposure to light.

The positive-type photosensitive acrylic resin is preferably a material composed of a copolymer of methacrylic acid and glycidyl methacrylate as a base polymer mixed with a naphthoquinone diazide positive-type photosensitive agent, for example. Since this resin contains the glycidyl group, it can be crosslinked (cured) by heating. After curing, the resin has the properties of: a dielectric constant of about 3.4; and a transmittance of 90% or more for light with a wavelength in the range of 400 to 800 nm. The resin can be decolored in a shorter time by being irradiated with line (365 nm) ultraviolet light. Ultraviolet light other than the i line can be used for patterning. Since the heat resistance of the photosensitive acrylic resin used in this example is generally 280° C., the degradation of the interlayer insulating film can be suppressed by conducting the process such as the formation of the pixel electrodes after the formation of the interlayer insulating film at a temperature in the range of about 250° C. to 280° C.

The formation of the interlayer insulating film 68 using the above-described photosensitive acrylic resin with high transparency will be described in detail.

First, a solution containing the photosensitive transparent acrylic material is applied to the substrate by spin coating, followed by a normal photo-patterning process including prebaking, pattern exposure, alkaline development, and cleaning with pure water in this order.

Specifically, the interlayer insulating film 68 with a thickness of 3 μm is formed by applying a solution containing the photosensitive transparent acrylic resin to the resultant substrate by spin coating. More specifically, the acrylic resin with a viscosity of 29.0 cp is applied at a spin rotation of 900 to 1100 rpm. This makes it possible to obtain flat pixel electrodes without steps unlike in the conventional method, minimizing disturbances in the orientation of liquid crystal molecules and improving the resultant display quality.

Subsequently, the resultant substrate is heated to about 100° C. to dry a solvent of the photosensitive transparent acrylic resin (e.g., ethyl lactate, propylene glycol monomethyl ether acetate, etc.). The resultant photosensitive acrylic resin is exposed to light according to a predetermined pattern and developed with an alkaline solution (tetramethyl ammonium abbreviated to abbreviated to "TMAH"). The portions of the substrate exposed to light are etched with the alkaline solution, forming the contact holes 56 through the interlayer insulating film 68. The concentration of the developing solution is preferably in the range of 0.1 to 1.0 mol % (in the case of TMAH). When the concentration exceeds 1.0 mol %, the portions of the photosensitive transparent acrylic resin which are not exposed to light are also largely etched, making it difficult to control the thickness of the photosensitive transparent acrylic resin. When the concentration of the developing solution is as high as 2.4 mol %, altered substances from the acrylic resin are left in the etched portions as residues, causing contact failure. When the concentration is less than 0.1 mol %, the concentration largely varies as the developing solution is circulated for repeated use. This makes it difficult to control the concentration. Thereafter, the developing solution left on the substrate surface is washed away with pure water.

As described above, the interlayer insulating film can be formed by spin coating. Accordingly, the thickness of the film which may be several micrometers can be made uniform easily by appropriately selecting the rotation of the spin coater and the viscosity of the photosensitive transparent acrylic resin. The contact hole can be made into a smooth tapered shape by appropriately selecting the amount of light exposure during the pattern exposure, the concentration of the developing solution, and the developing time.

The resin may appear colored after the development depending on the type and amount of the photosensitive agent (e.g., naphthoquinone diazide photosensitive agents and naphthoquinone diazide positive-type photosensitive agents) contained in the photosensitive transparent acrylic resin. To avoid this problem, the entire substrate is exposed to light to allow the remaining unnecessary colored photosensitive agent contained in the resin to completely react, so as to eliminate light absorption in the visible region and thereby to make the acrylic resin transparent. Examples of the photosensitive agent include naphthoxy diazide positive-type photosensitive agents and naphthoquinone diazide photosensitive agents.

Figure 11:
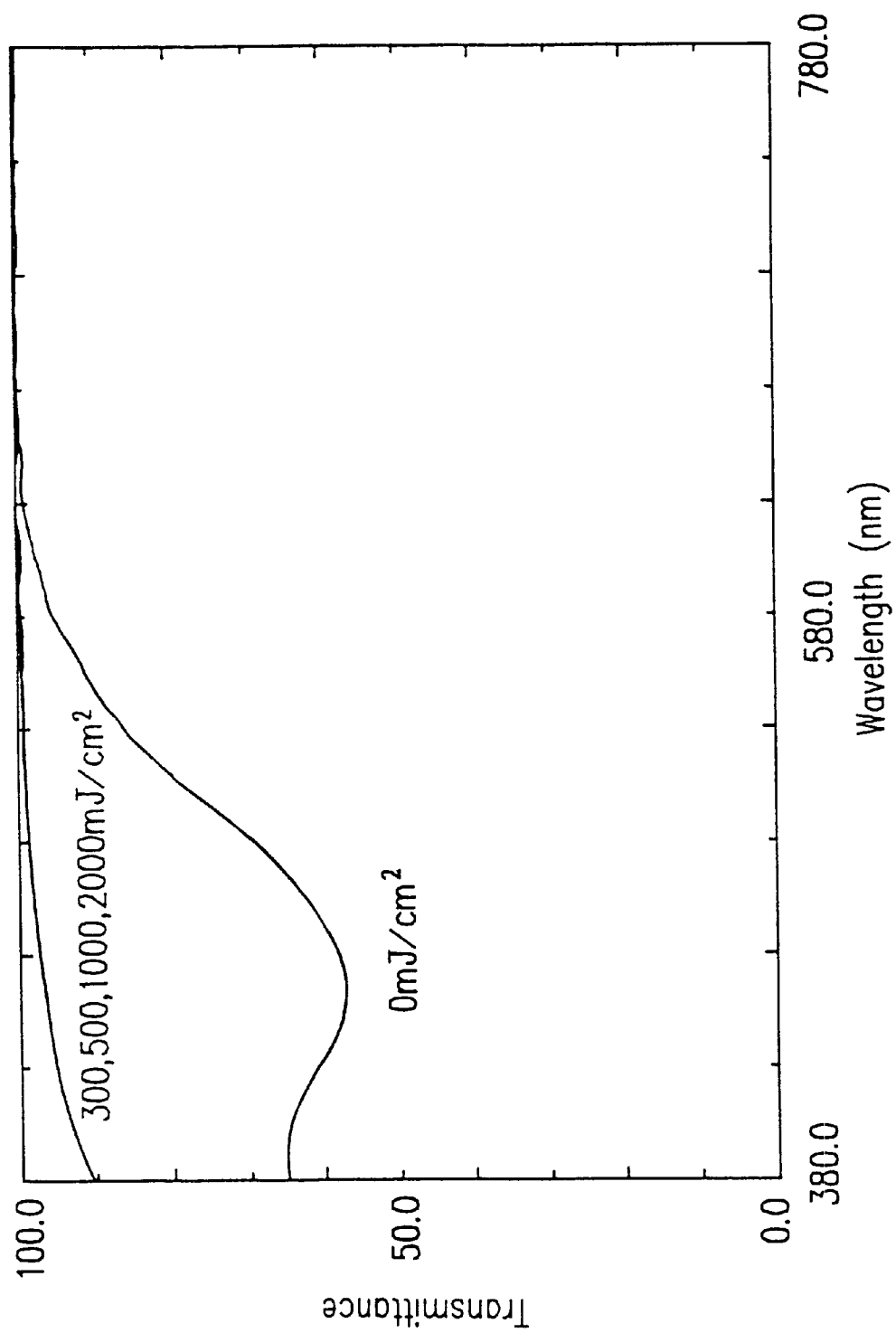
FIG. 11 is a graph illustrating the variation in the transmittance before and after light exposure of an acrylic resin, depending on the wavelength (nm) of transmitted light for the transmission type liquid crystal display device of Example 7.

FIG. 11 shows the variation in the light transmittance of the surface of the acrylic resin with a thickness of 3 μm before and after being exposed to light such as ultraviolet light, depending on the wavelength (nm) of the transmitted light. As is observed from FIG. 11, when the resin has not been exposed to light, the transmittance of the resin is 65% for transmitted light with a wavelength of 400 nm. After the resin is exposed to light, the transmittance is improved to 90% or more. In this case, the substrate was irradiated with light from the front side thereof. This light exposure step can be shortened by irradiating the substrate with light from both the front side and the back side. This improves the throughput of the process.

Finally, the resultant substrate is heated to cure the resin by crosslinking. More specifically, the substrate is placed on a hot plate or in a clean oven and heated to about 200° C. to cure the resin.

Thus, by using the photosensitive transparent resin, the interlayer insulating film 68 and the contact holes 56 formed through the interlayer insulating film 68 for connecting the pixel electrodes and the drain electrodes of the switching elements can be formed only by the photo-patterning without the conventional etching and resist-removing steps. This simplifies the fabrication process. The thickness of the photosensitive transparent acrylic resin may be any desired value in the range of 0.05 to 10 μm (3 μm in Example 7; note that the light transmittance lowers and the coloring is more prominent as the thickness becomes larger) and can be made uniform by appropriately selecting the viscosity of the resin solution and the rotation of the spin coater during spin coating.

Thereafter, ITO is deposited on the photosensitive transparent acrylic resin to a thickness of 50 to 150 nm by sputtering and is patterned to form the pixel electrodes 51. The ITO film as each pixel electrode 51 having a thickness of 50 nm or more effectively prevents an agent (e.g., dimethyl sulfoxide) used as a removing solution from permeating from gaps of the surface of the ITO film into the resin and the resin from expanding due to the permeation of the agent. The active matrix substrate of Example 7 is thus fabricated.

Thus, in this example, as in the previous examples, with the existence of the interlayer insulating film 68, all the portions of the display panel other than the source and gate line portions can be used as pixel aperture portions. The resultant liquid crystal display device is bright with high transmittance and a large aperture ratio.

Moreover, with the existence of the interlayer insulating film 68, the pixel electrodes can be made flat without being influenced by steps formed by the underlying lines and switching elements. This prevents the occurrence of disconnection conventionally found at the steps on the drain sides of the pixel electrodes, and thereby reduces the number of defective pixels. Disturbances in the orientation of liquid crystal molecules caused by the steps can also be prevented. Furthermore, since the source lines 53 and the pixel electrodes 51 are isolated from each other with the interlayer insulating film 68 therebetween, the number of defective pixels conventionally caused by the electrical leakage between the source lines 53 and the pixel electrodes 51 can be reduced.

Further, in this example, the interlayer insulating film 68 can be formed only by the resin formation step, instead of the film formation step, the pattern formation step with a photoresist, the etching step, the resist removing step, and the cleaning step conventionally required. This simplifies the fabrication process.

EXAMPLE 8

In Example 8, the method for improving the adhesion between the interlayer insulating film 68 and the underlying films described in Example 7 shown in FIGS. 9 and 10 will be described.

The adhesion of the photosensitive transparent acrylic resin as the interlayer insulating film 68 with the underlying films may be inferior depending on the materials of the underlying films. In such a case, according to the method of this example, the surfaces of the underlying films, i.e., the gate insulating film 63, the channel protection film 65, the source electrode 66a, the drain electrode 66b, the transparent conductive films 67a and 67a', and the metal films 67b and 67b' are exposed to ultraviolet light from an M-type mercury lamp (860 W) in an oxygen atmosphere before the application of the photosensitive transparent acrylic resin, so as to roughen the surfaces. The interlayer insulating film 68 made of the photosensitive transparent acrylic resin is then formed on the roughened surfaces of the underlying films. The subsequent steps are the same as those described in Example 7. By this method, the adhesion between the photosensitive transparent acrylic resin and the surface-roughened underlying films improves. This overcomes the conventional problem of the film peeling at the interface between the interlayer insulating film 68 made of the photosensitive transparent acrylic resin and the underlying films. This condition results when an agent such as a mixture of hydrochloric acid and iron chloride for etching ITO, permeates into the interface.

Thus, by irradiating the substrate surface before the formation of the interlayer insulating film 68 with ultraviolet light, the adhesion between the interlayer insulating film 68 and the underlying films improves. The resultant device can be stable despite further processing during the fabrication process.

An alternative method for improving the adhesion according to the present invention is to treat the surface to be coated with the resin with a silane coupling agent before the coating with the resin. As the silane coupling agent, hexamethyl disilazane, dimethyl diethoxy silane, n-butyl trimethoxy silane, and the like are especially effective in improvement of the adhesion. For example, in the case of adhesion with the silicon nitride film, it has been found that the adhesion strength of the treated surface improves by about 10% compared with that of the surface not treated with the silane coupling agent. The problem that the pattern of the resin is damaged due to an internal stress generated by the crosslinking of the resin, which sometimes occurs if the surface is not so treated, is prevented by this treatment with the silane coupling agent.

The silane coupling agent may be blended in the resin before the application of the resin, instead of applying the agent to the underlaying layer before the application of the resin. The same adhesion effect can be obtained by this method. Specifically, when 1 wt % of dimethyl diethoxy silane was added to the photosensitive acrylic resin, the adhesion strength of the resin with the silicon nitride film (i.e., a under laying layer) improved by 70%.

EXAMPLE 9

In Example 9, the method for improving the adhesion between the interlayer insulating film 68 and the pixel electrode material formed thereon described in Example 7 and shown in FIGS. 9 and 10 will be described.

After the formation of the interlayer insulating film 68 made of the photosensitive transparent acrylic resin in Example 7, the surface portion of the interlayer insulating film 68 with a thickness of 100 to 500 nm is ashed in an oxygen plasma atmosphere using a dry etching apparatus. More specifically, the surface of the acrylic resin is ashed in the oxygen plasma atmosphere using a parallel plane type plasma etching apparatus under the conditions of a RF power of about 1.2 KW, a pressure of about 800 m Torr, an oxygen flow rate of about 300 sccm, a temperature of 70° C., and a RF applying time of about 120 seconds. By this process, water and carbon dioxide are released from the surface of the acrylic resin by oxidation decomposition, and thus the surface is roughened.

Thereafter, ITO is deposited on the roughened photosensitive transparent acrylic resin to a thickness of about 50 to about 150 nm by sputtering and patterned to form the pixel electrodes 51. The active matrix substrate is thus fabricated.

By this ashing, the adhesion between the pixel electrodes 51 and the underlying roughened interlayer insulating film 68 made of the photosensitive transparent acrylic resin greatly improves. No delamination at the interface thereof was caused by an application of ultrasound for cleaning the substrate. The above effect was not obtained when the thickness of the ashed surface portion of the acrylic resin was less than 100 nm. When it exceeds 500 nm, the decrease in the thickness of the photosensitive transparent acrylic resin is so large that the variation in the thickness of the resultant acrylic resin increases, causing display troubles. The improvement in the adhesion is obtained by using any type of the dry etching apparatus including a barrel type and a RIE type.

Thus, by ashing the surface portion of the interlayer insulating film 68 in the oxygen plasma atmosphere before the formation of the pixel electrodes, the adhesion between the interlayer insulating film 68 and the pixel electrode material improves. The resultant device can be stable against further processing during the fabrication process. In addition, the ashing is also effective in removing residues from the contact holes. This reduces the occurrence of disconnection in the contact holes.

In this example, the ashing is conducted after the crosslinking of the resin for the interlayer insulation film. This is advantageous for conducting the ashing step in a more stable condition, since gas is generated in the crosslinking step.

EXAMPLE 10

Figure 14:
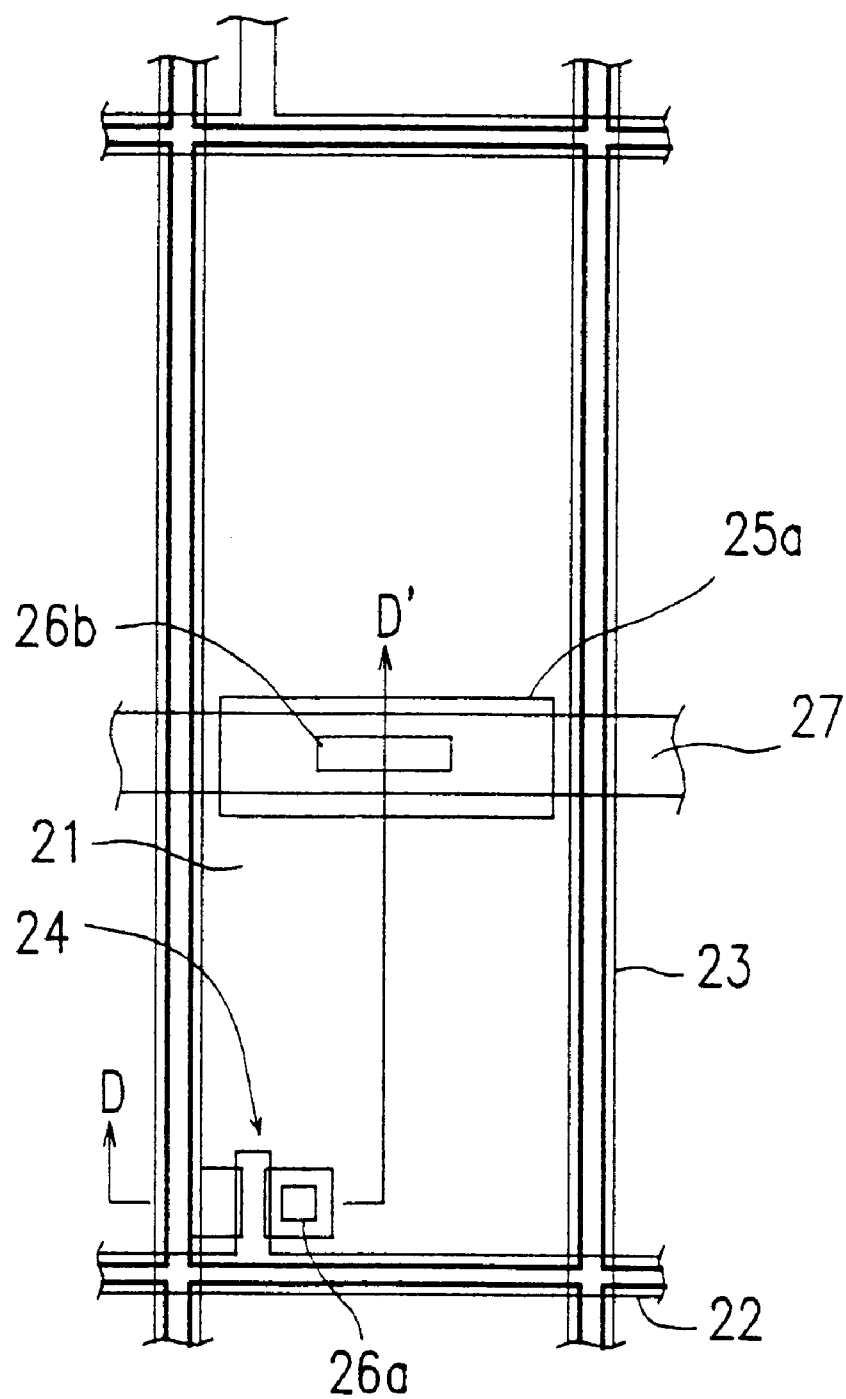
FIG. 14 is a plan view of a one-pixel portion of an active matrix substrate of a transmission type liquid crystal display device of Example 10 according to the present invention.
Figure 15:
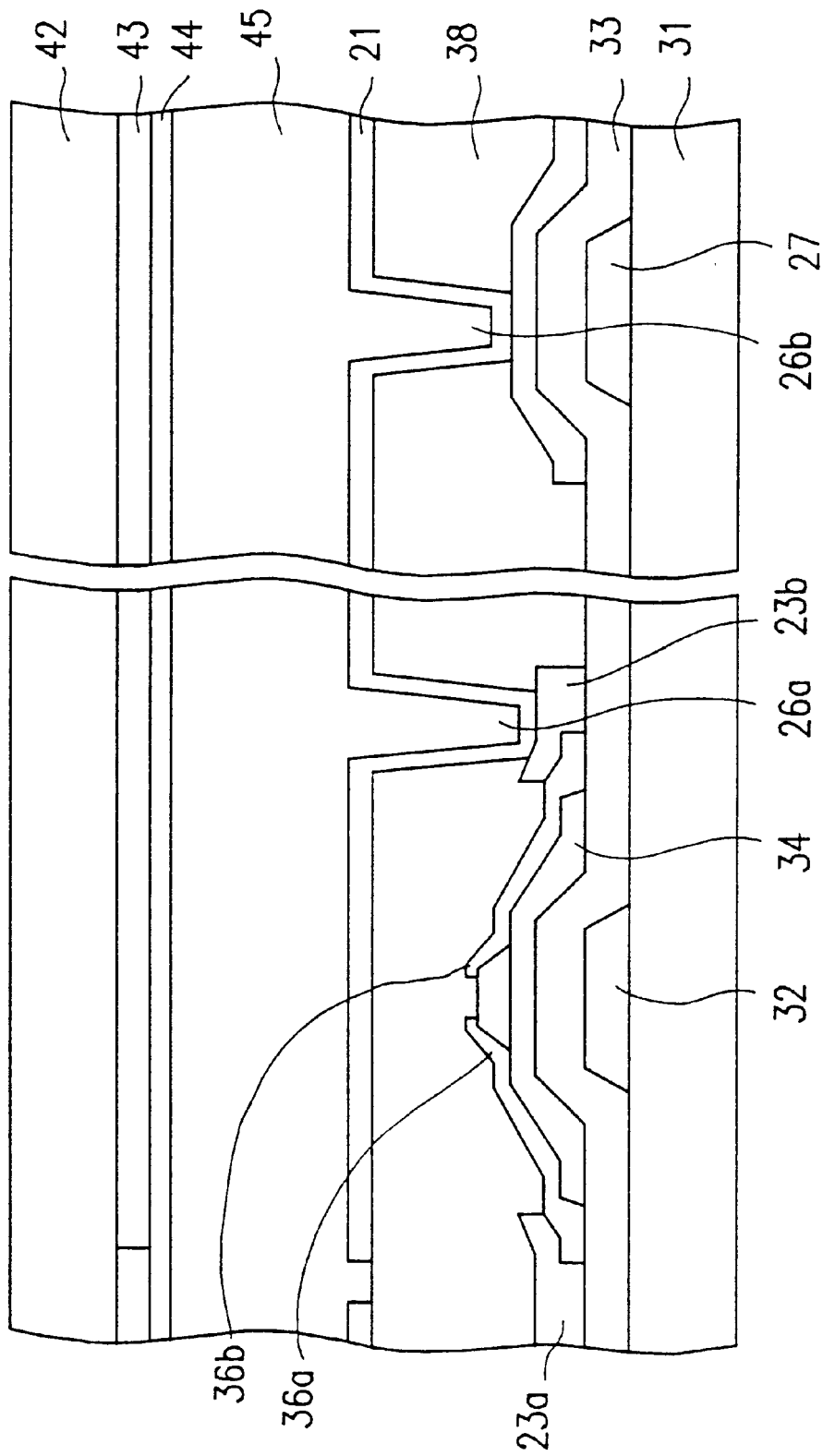
FIG. 15 is a sectional view taken along line D-D' of FIG. 14.

FIG. 14 is a plane view of an active matrix substrate of the transmission type liquid crystal display device of Example 10 according to the present invention. FIG. 15 is a sectional view taken along line D-D' of FIG. 14. Components having like functions and effects are denoted by the same reference numerals as those in FIGS. 1 and 2, and the description thereof is omitted.

In the active matrix substrate of this example, the connections between each TFT 24 and the corresponding pixel electrode 21 and between each storage capacitor electrode 25a and the corresponding pixel electrode 21 are effected via separate contact holes 26a and 26b, respectively. Also, in this example, each source line 23 is composed of a single metal layer, though it may be of a multi-layer structure. The storage capacitor electrodes 25a are formed of the same material as that of the source lines 23 in the same step as in the previous examples. The two contact holes 26a and 26b are formed above a metal electrode 23b connected to the drain electrode 36b of the TFT and above the storage capacitor electrode 25a, respectively. That is, these contact holes 26a and 26b formed above the metal electrodes having a light-shading property.

The transmission type liquid crystal display device with the above structure is advantageous in the following points.

When the thickness of the interlayer insulating film 38 is as large as 3 μm, for example, which is well comparable with the typical thickness of a liquid crystal layer (a cell thickness) of 4.5 μm, light leakage tends to occur around the contact holes 26a and 26b due to disturbances in the orientation of the liquid crystal molecules. If the contact holes 26a and 26b are formed in the aperture portions of the transmission type liquid crystal display device, the contrast ratio is lowered due to the light leakage. In contrast, the active matrix substrate of this example is free from this trouble because the storage capacitor electrode 25a blocks the light from around the contact holes 26b and the metal electrode 23b blocks the light from around the contact holes 26a. The aperture ratio can be further increased by forming the storage capacitor counter electrodes 27 so that they do not extend from the storage capacitance electrode 25a. Though the $C_s$-Common type was used in this example, the $C_s$-on-Gate type can also be used.

Thus, in Examples 1 to 10 above, each pixel electrode overlaps the corresponding lines to improve the aperture ratio of the liquid crystal display, to minimize disturbances in the orientation of the liquid crystal molecules, and to simplify the fabrication process. Also, the influence of the capacitances between the pixel electrode and the lines appearing on the display, such as crosstalk, is minimized to achieve a good display. In addition to these features, a wide viewing angle can be obtained.

The wide viewing angle can be obtained due to the following reasons: (1) The orientation of the liquid crystal molecules is not disturbed since the surfaces of the pixel electrodes are flat; (2) No disclination line is generated due to the electric field generated at the lines; (3) oblique light from the backlight can be effectively used by having the interlayer insulating film 38 as thick as several micrometers while the distance between adjacent aperture portions is in the range of several microns to ten and several microns; and (4) The contrast is large (1:300 or more for a 10.4-inch SVGA). As a result, the retardation value, i.e., the refractive index anisotropy of liquid crystal (Δn)×cell thickness (d), can be reduced. This reduction of the retardation is obtained mainly by reducing the cell thickness according to the present invention. In general, as the value of Δn×d decreases, the viewing angle increases but the contrast decreases. According to the present invention, however, the size of the pixel electrodes is made large by eliminating the margins conventionally provided between the pixel electrodes and the corresponding lines. For example, for a 10.4" VGA, the aperture ratio increased by about 20 points from 65% to 86%, and the brightness also increased by more than 1.5 times. For a 12.1" XGA, similarly, the aperture ratio greatly increased from 55% to 80%. The reason is as follows. In the conventional structure, when the source line width is 6 μm, the gap between the source line and the pixel electrode is 3 μm, and the attachment margin is 5 μm, for example, the distance between adjacent aperture portion is required to be 22 μm or more. In contrast, according to the present invention where each pixel electrode overlaps the corresponding source lines, the distance between adjacent aperture portions can be 6 μm which is the source line width. Thus, the ratio of the portion which does not constitute the aperture portion to the entire area can be greatly reduced.

Figure 12:
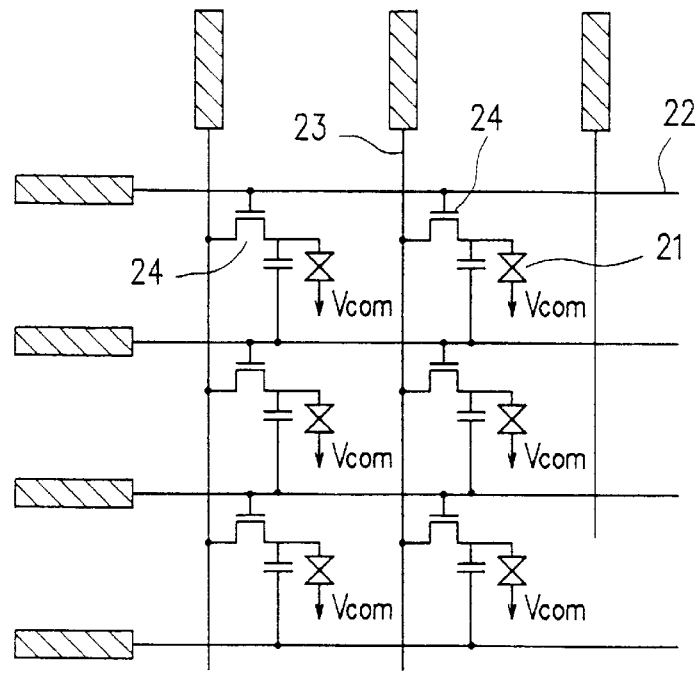
FIG. 12 is a circuit diagram of a $C_s$-on-gate type liquid crystal display device.
Figure 13:
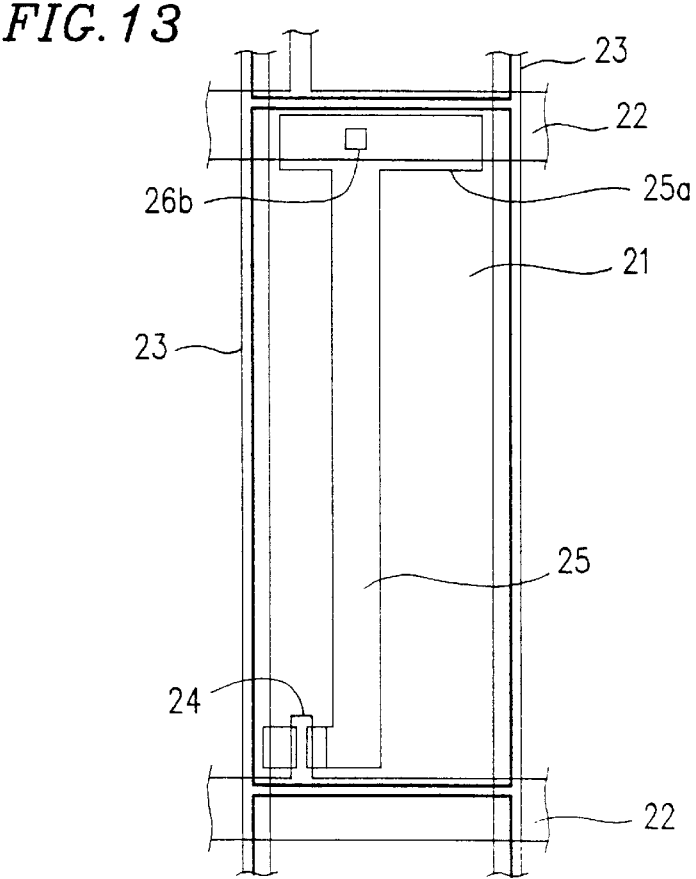
FIG. 13 is a plan view of a one-pixel portion of an active matrix substrate obtained by applying the structure of Example 3 to the liquid crystal display device shown in FIG. 12.

Examples 3 and 4 described the transmission type liquid crystal display device where one electrode of the storage capacitor (a storage capacitor electrode) is connected to the counter electrode via the storage capacitor common line. The same effects obtained by the above structure can also be obtained by using the gate line 22 of the adjacent pixel as the storage capacitor electrode. FIGS. 12 and 13 show the latter structure. This type of liquid crystal display device is called a $C_s$-on-gate type, where each pixel electrode 21 overlaps the immediately before or next gate line 22 to form a storage capacitor $C_s$. In this case, the pixel electrode 21 preferably overlaps a larger portion of the immediately before or next gate line while it overlaps a smaller portion of the corresponding gate line.

In Examples 1 to 10, the photosensitive transparent acrylic resin with high transparency is applied by spin coating and patterned to form the interlayer insulating film, and the contact holes are formed through the interlayer insulating film. The application of the photosensitive transparent acrylic resin can also be conducted by methods other than the spin coating, such as roll coating and slot coating. The effects of the present invention can also be obtained by these methods. Roll coating is a method where a substrate is allowed to pass through between a roll with an uneven surface and a belt with the surface of the substrate to be subjected to the coating facing the roll. The thickness of the resultant coating is determined by the degree of the unevenness. The slot coating is a method where a substrate is allowed to pass under an ejection slot. The thickness of the resultant coating is determined by the width of the ejection slot.

In Examples 7 and 8, among the i line (wavelength: 365 nm), the h line (wavelength: 405 nm), and the g line (wavelength: 436 nm) generally used for the light exposure process, the i line having the shortest wavelength is used. This shortens the light irradiation time, and is highly effective in decoloring in Example 7 and in roughening the surface in Example 8.

Thus, according to the present invention, with the existence of the interlayer insulating film, each pixel electrode can be formed to overlap the corresponding lines. This improves the aperture ratio and minimizes disturbances in the orientation of the liquid crystal molecules. Since the interlayer insulating film is composed of an organic thin film, the dielectric constant thereof is smaller and the thickness thereof can be easily larger, compared with an inorganic thin film. Thus, the capacitances between the pixel electrode and the lines can be reduced. As a result, vertical crosstalk caused by the capacitance between the pixel electrode and the source line can be reduced, and the feedthrough of the write voltage to the pixels caused by the capacitance between the pixel electrode and the gate line, as well as the variation in the fabrication process, can be reduced.

In the formation of the interlayer insulating film, the photosensitive organic material such as an acrylic resin is applied to the substrate by a coating method and patterned by light exposure and development to obtain an organic thin film with a thickness of several micrometers with high productivity. This makes it possible to fabricate the transmission type liquid crystal display device with a high aperture ratio without largely increasing production cost. The transmission type liquid crystal display device with a high aperture ratio can also be obtained by forming the organic thin film by deposition, forming a photoresist on the organic thin film, and patterning the organic thin film in an etching process. In the case where the resin used for the interlayer insulating film is colored, the resin can be made transparent by optically or chemically decoloring the resin after the patterning. As a result, a good color display can be obtained.

The connecting electrode for connecting the drain electrode of the TFT and the pixel electrode is formed using the transparent conductive film. This further improves the aperture ratio. The transparent conductive film can be formed simultaneously with the source line which is of a double-layer structure including the transparent conductive film. With the double-layer structure, disconnection at the source line can be prevented.

Each contact hole is formed through the interlayer insulating film above the storage capacitor common line or the gate line (i.e., scanning line). This improves the contrast ratio because light leakage which may be generated due to a disturbance in the orientation of the liquid crystal can be blocked by the storage capacitor portion. In other words, light leakage is generated in the light-shading portions, if generated, not in the aperture portions.

The metal nitride layer may be formed under each contact hole formed through the interlayer insulating film. This improves the adhesion between the interlayer insulating film and the underlying film. Thus, the resultant liquid crystal display device is stable against further processing in the production process.

Each pixel electrode may overlap the corresponding source line by 1 $\mu$m or more. With this overlap, the aperture ratio can be maximized. Also, the processing precision of each pixel electrode with respect to the corresponding lines is not necessarily required to be high. This is because, even if the processing precision is low, light leakage can be well blocked by the overlapping lines as long as the pixel electrode overlaps the lines.

By having the thickness of the interlayer insulating film be 1.5 $\mu$m or more (preferably, 2.0 $\mu$m or more), the capacitance between each pixel electrode and the corresponding source line can be sufficiently small. This reduces the time constant even though the pixel electrode overlaps the source line by 1 $\mu$m or more. As a result, the influence of the capacitance appearing on the display, such as crosstalk, can be reduced, and thus a good display can be provided.

The vertical crosstalk is further reduced by decreasing the capacitance ratio represented by expression (1) above to 10% or less, since the capacitance between the pixel electrode and the source line is sufficiently reduced.

The polarity of the data signal supplied from the source line may be inverted every gate line. This further reduces the influence of the capacitance between each pixel electrode and the corresponding source line appearing on the display, such as vertical crosstalk.

The effects of the present invention can also be obtained for the active matrix substrate where the pixel electrodes are arranged in a vertical stripe shape and each pixel electrode is of a rectangular shape with the side thereof parallel to the source line being longer than the side thereof parallel to the gate line. This makes it possible to obtain a large-scale liquid crystal display device with a high aperture ratio free from vertical crosstalk for notebook type personal computers and the like.

Each storage capacitor is formed using an insulating film which is extremely thinner than the interlayer insulating film. The resultant storage capacitor can have a large capacitance while the area thereof is small. This improves the aperture ratio. Since the storage capacitor electrodes are formed simultaneously with the source lines (i.e., signal lines), an increase in the number of process steps can be avoided.

When the source lines are composed of light-shading conductive films, the contact hole portions can be blocked from light. This conceals disturbances in the orientation of the liquid crystals occurring at these portions, improving the display quality. This also improves the aperture ratio.

In the case of using a photosensitive resin reactive to ultraviolet light, if the resin has a reactive peak at the i line, the contact holes can be formed with high precision. Also, since the peak is farthest from the visible light, coloring can be minimized. This improves the transmittance of the resultant transmission type liquid crystal display device, and thus the amount of light from a backlight can be reduced, saving power consumption, or the brightness can be increased if the amount of light from the backlight is not reduced.

Since the interlayer insulating film according to the present invention is comparatively thick and can be made flat, conventional troubles caused by steps formed by the underlying lines and the like, such as disconnection on the drain side of the pixel electrode, are overcome. Disturbances in the orientation of the liquid crystal is also prevented. The pixel electrodes and the lines are isolated by the interlayer insulating film formed therebetween. This greatly reduces the number of defective pixels due to electrical leakage between the pixel electrodes and the lines, thereby increasing production yield and reducing production cost. Moreover, according to the present invention, the interlayer insulating film can be formed only by the resin formation step, instead of the film formation step, the pattern formation step with a photoresist, the etching step, the resist removing step, and the cleaning step conventionally required. This simplifies the fabrication process and reduces production cost.

The entire substrate may be exposed to light to allow the remaining unnecessary photosensitive agent contained in the photosensitive transparent acrylic resin to completely react after the light exposure and development of the interlayer insulating film. With this process, an interlayer insulating film with higher transparency can be obtained.

The surface of the substrate before the formation of the interlayer insulating film may be irradiated with ultraviolet light. This improves the adhesion between the interlayer insulating film and the underlying film. Thus, the resultant liquid crystal display device can be stable against further processing in the production process.

The surface of the interlayer insulating film may be ashed in an oxygen plasma atmosphere before the formation of the film of pixel electrode material. This improves the adhesion of the interlayer insulating film and the film of the pixel electrode material formed thereon. Thus, the resultant liquid crystal display device can be stable against further processing in the production process.

The pixel electrodes with a thickness of 50 nm or more can effectively prevent an agent used as a removing solution from permeating from gaps of the film surface into the resin and the resin from expanding due to the permeation of the agent.

The light irradiation time can be shortened and the decoloring efficiency is high by using the i line (wavelength: 365 nm) having higher energy than visible light.

As the aperture ratio of the display improves, the brightness thereof also improves. Accordingly, the viewing angle can be widened by reducing the retardation without degrading the contrast. This makes it possible to obtain a significantly wide viewing angle.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A transmission type liquid crystal display device comprising:
   a plurality of lines including gate lines and source lines, wherein at least one of the plurality of lines is at least partially light-shading;
   switching elements each arranged near a crossing of each gate line and each source line, a gate electrode of each switching element being connected to the gate line, a source electrode of the switching element being connected to the source line, and a drain electrode of the switching element being connected to a pixel electrode for applying a voltage to a liquid crystal layer, wherein:
      an interlayer organic insulating film has high transparency and is above the switching element, the gate line and the source line; and
      the display device further comprises a connecting electrode connected to the drain electrode and to the pixel electrode via a contact hole through the interlayer organic insulating film between the connecting electrode and the pixel electrode, and wherein the connecting electrode is on the light-shading part of the at least one of the plurality of lines.

2. A transmission type liquid crystal display device according to claim 1, wherein the interlayer organic insulating film is made of a photosensitive acrylic resin.

3. A transmission type liquid crystal display device according to claim 1, wherein the interlayer organic insulating film is made of a decolored resin.

4. A transmission type liquid crystal display device according to claim 1, wherein the pixel electrode and at least one of the source line and the gate line overlap each other by 1 $\mu$m or more in a line width direction.

5. A transmission type liquid crystal display device according to claim 1, wherein the thickness of the interlayer organic insulating film is about 1.5 $\mu$m or more.

6. A transmission type liquid crystal display device according to claim 1, wherein the connecting electrode is formed of a transparent conductive film.

7. A transmission type liquid crystal display device according to claim 1, wherein a conductive metal nitride layer is formed below the contact hole to connect the connecting electrode and the pixel electrode.

8. A transmission type liquid crystal display device according to claim 1, further comprising:
   storage capacitor for holding a voltage applied to the liquid crystal layer, wherein a capacitance ratio is represented by expression:

$$\text{Capacitance ratio} = C_{sd}/(C_{sd}+C_{1s}+C_s),$$

and
   the ratio is 10% or less, wherein $C_{sd}$ denotes a capacitance value between the pixel electrode and the source line, $C_{1s}$ denotes a capacitance value of a liquid crystal portion corresponding to each pixel in an intermediate display state, and $C_s$ denotes a capacitance value of the storage capacitor of each pixel.

9. A transmission type liquid crystal display device according to claim 1, wherein the shape of the pixel electrode is rectangular with a side parallel to the gate line being shorter than a side parallel to the source line.

10. A transmission type liquid crystal display device according to claim 1, further comprising a driving circuit for supplying to the source line a data signal of which polarity is inverted for every horizontal scanning period, and the data signal is supplied to the pixel electrode via the switching element.

11. A transmission type liquid crystal display device according to claim 1, further comprising a storage capacitor for holding a voltage applied to the liquid crystal layer, the storage capacitor including: a storage capacitor electrode; a storage capacitor counter electrode; and an insulating film therebetween;

wherein the storage capacitor electrode is formed in the same layer as either the source line or the connecting electrode.

12. A transmission type liquid crystal display device according to claim 11, wherein the storage capacitor counter electrode is formed of a part of the gate line.

13. A transmission type liquid crystal display device according to claim 11, wherein the pixel electrode and the storage capacitor electrode are connected via the contact hole formed above the storage capacitor counter electrode.

14. A transmission type liquid crystal display device according to claim 11, wherein the contact hole is formed above either the storage capacitor counter electrode or the gate line.

15. A transmission type liquid crystal display device according to claim 1, wherein the drain electrode is offset laterally from the at least one of the plurality of lines.

16. A transmission type liquid crystal display device according to claim 1, wherein the plurality of lines further includes storage capacitor lines.

17. A transmission type liquid crystal display device according to claim 16, wherein the contact hole is aligned with the storage capacitor lines.

18. A transmission type liquid crystal display device according to claim 1, wherein the contact hole is aligned with the gate lines.

* * * * *